(12) United States Patent
Reuter et al.

(10) Patent No.: US 11,813,916 B2
(45) Date of Patent: Nov. 14, 2023

(54) INTEGRATED AIR SUPPLY UNIT

(71) Applicant: BeijingWest Industries Co., Ltd., Beijing (CN)

(72) Inventors: David Fredrick Reuter, Moraine, OH (US); Daniel Norbert Borgemenke, Springboro, OH (US); Adam Michael Osswald, Moraine, OH (US); Michael William Landis, Bellbrook, OH (US); Sury Peddireddi, Moraine, OH (US)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 17/501,049

(22) Filed: Oct. 14, 2021

(65) Prior Publication Data

US 2023/0122679 A1    Apr. 20, 2023

(51) Int. Cl.
*B60G 17/052* (2006.01)
*B60G 17/056* (2006.01)
*B60G 17/015* (2006.01)

(52) U.S. Cl.
CPC ....... *B60G 17/0523* (2013.01); *B60G 17/056* (2013.01); *B60G 17/0155* (2013.01); *B60G 2500/203* (2013.01)

(58) Field of Classification Search
CPC ............. B60G 17/056; B60G 17/0523; B60G 17/0155; B60G 2500/203
See application file for complete search history.

(56) References Cited

U.S. PATENT DOCUMENTS

| 7,455,371 B2 | 11/2008 | Duchet et al. |
| 7,849,880 B2 | 12/2010 | Herges |

(Continued)

FOREIGN PATENT DOCUMENTS

| CN | 106089630 A | 11/2016 |
| CN | 205744338 U | 11/2016 |

(Continued)

OTHER PUBLICATIONS

Extended European Search Report dated May 10, 2023 for counterpart European Patent Application No. 22201150.4 (9 Pages).

*Primary Examiner* — Jason D Shanske
*Assistant Examiner* — Matthew James O'Neill
(74) *Attorney, Agent, or Firm* — William H. Honaker; Dickinson Wright PLLC

(57) ABSTRACT

An integrated air supply unit comprises a compressor housing, a pressure control unit (PCU) body, and a desiccant housing extending between the compressor housing and the PCU body. The desiccant housing defines a desiccant cavity holding a desiccant container for removing moisture from air passing therethrough. A piston is slidably disposed within a piston bore of the compressor housing. The PCU body defines a plurality of fluid passages with solenoid valves selectively controlling airflow therethrough. The integrated air supply unit may also comprise: a manifold, a discharge control valve, a compressor supplying pressurized air in a first pressurized air passage, a dryer configured to remove moisture from the pressurized air in the first pressurized air passage and to supply dried pressurized air in a second pressurized air passage, a supply control valve to control airflow between the second pressurized air passage and the manifold, and a piloted exhaust valve.

19 Claims, 14 Drawing Sheets

(56) References Cited

U.S. PATENT DOCUMENTS

| | | |
|---|---|---|
| 9,764,278 B2 | 9/2017 | Bergemann et al. |
| 9,926,994 B2 * | 3/2018 | Frank ..................... F16F 9/02 |
| 10,017,025 B2 | 7/2018 | Reuter et al. |
| 10,343,479 B2 * | 7/2019 | Bodet ................. F15B 21/044 |
| 10,391,830 B2 | 8/2019 | Bohn et al. |
| 10,596,873 B2 | 3/2020 | Reuter et al. |
| 10,717,336 B2 | 7/2020 | Frank et al. |
| 10,737,215 B2 * | 8/2020 | Oishi ................ B01D 53/0407 |
| 10,767,639 B2 | 9/2020 | Meissner et al. |
| 2009/0200125 A1 * | 8/2009 | Sonsterod ............... F16F 9/341 |
| | | 251/325 |
| 2011/0256001 A1 * | 10/2011 | Kobayashi ............ F04B 25/005 |
| | | 417/339 |
| 2014/0251470 A1 * | 9/2014 | Bissbort ................ F15B 11/167 |
| | | 137/565.17 |
| 2014/0301873 A1 | 10/2014 | Hartl et al. |
| 2015/0345490 A1 | 12/2015 | Bremeier et al. |
| 2018/0287531 A1 | 10/2018 | Abdelfattah et al. |
| 2019/0111753 A1 | 4/2019 | Reuter et al. |
| 2020/0269645 A1 * | 8/2020 | Reuter, II ............. B60G 17/056 |
| 2021/0107329 A1 * | 4/2021 | Jensen ............... B60G 17/0162 |

FOREIGN PATENT DOCUMENTS

| | | |
|---|---|---|
| CN | 110422158 B | 7/2020 |
| DE | 102015219613 A1 | 4/2017 |
| EP | 3616771 A1 | 3/2020 |
| WO | 2017013002 A1 | 1/2017 |

\* cited by examiner

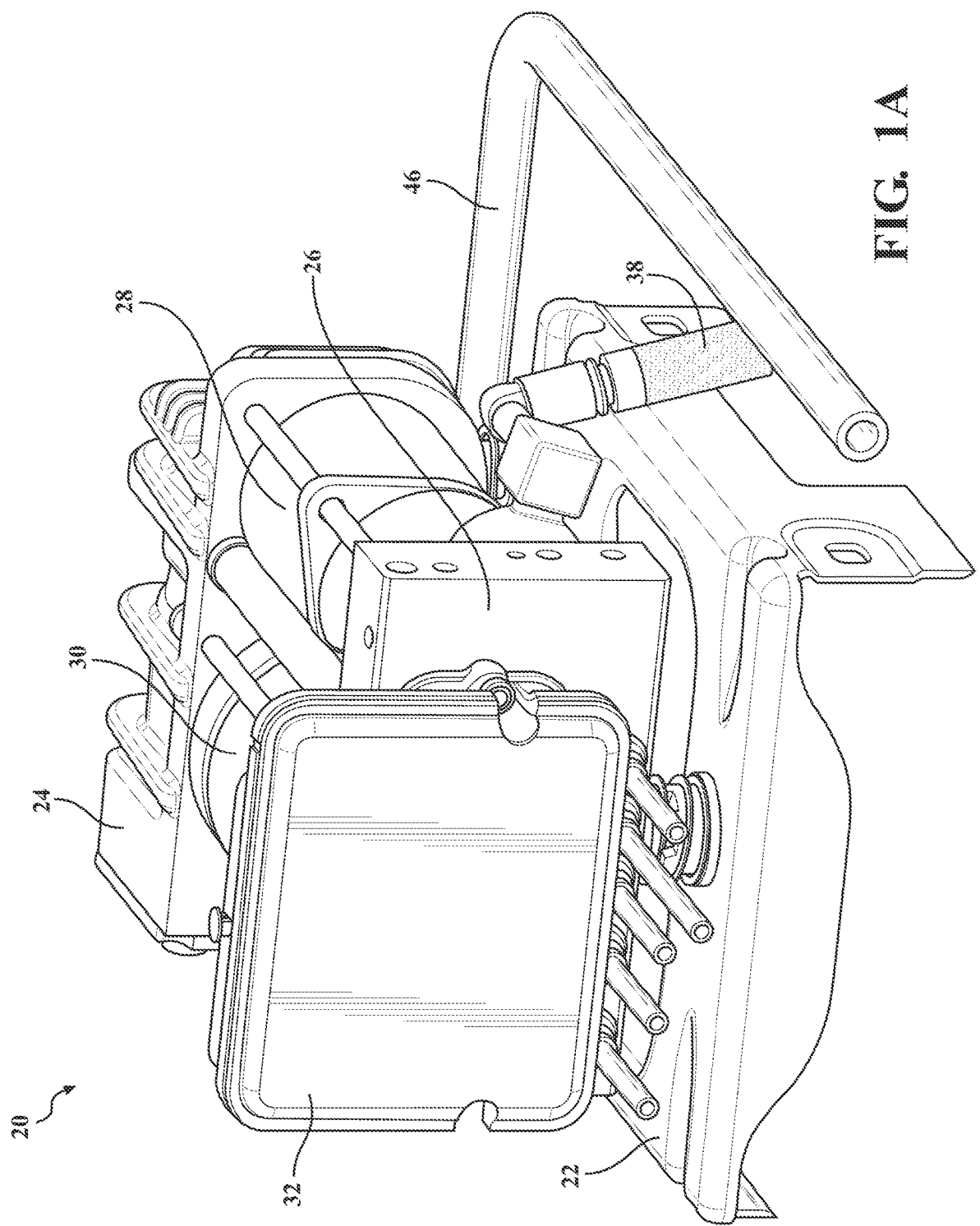

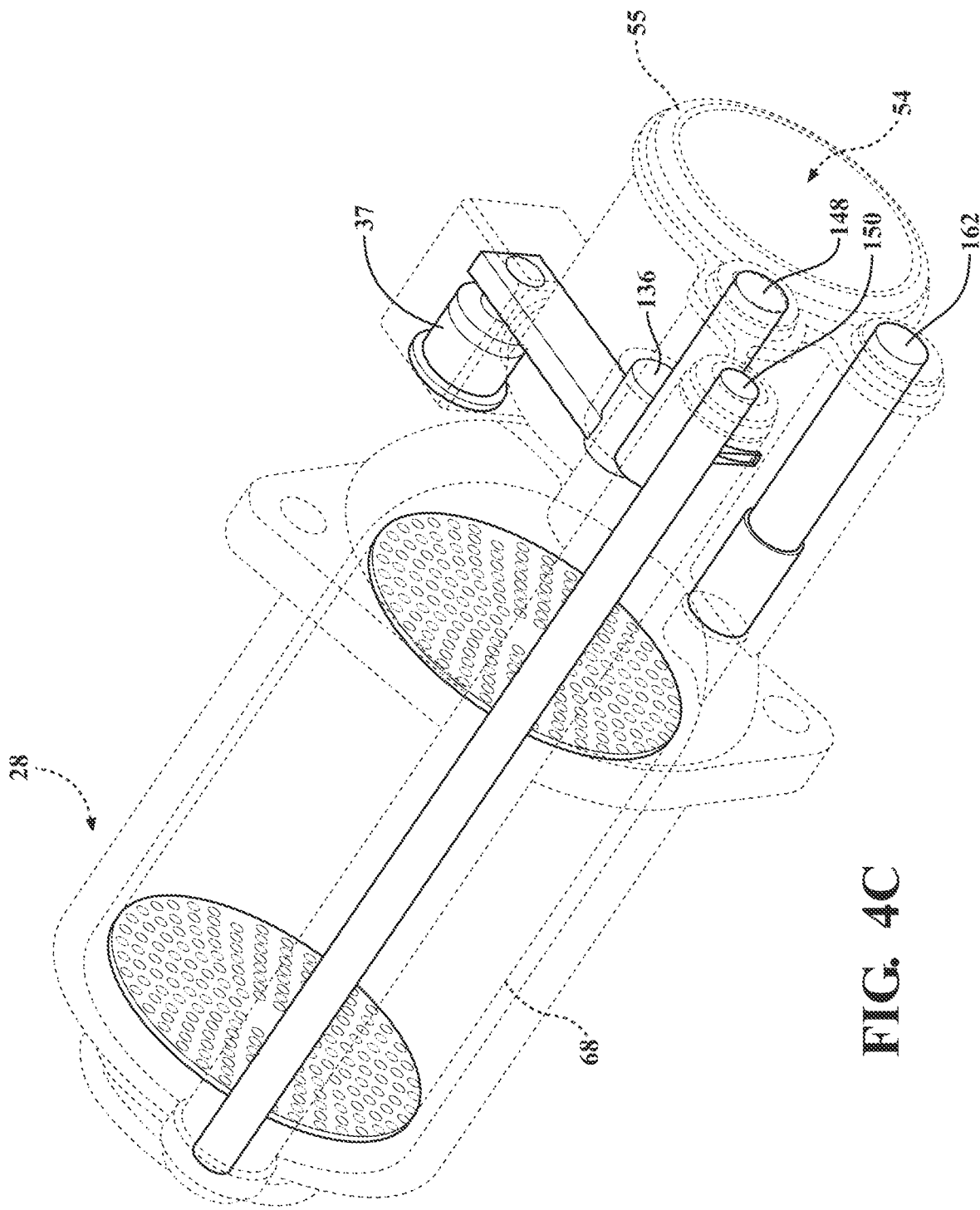

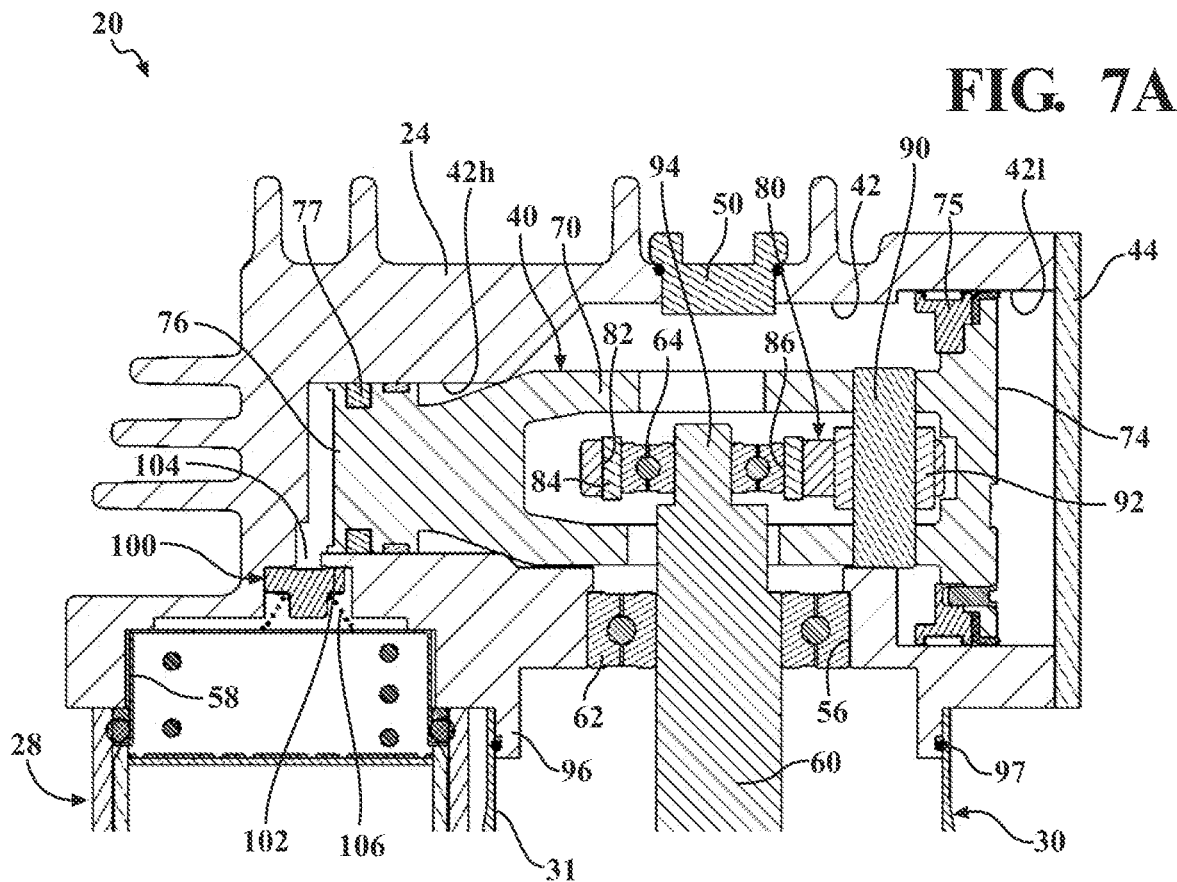

INTEGRATED AIR SUPPLY UNIT

BACKGROUND OF THE INVENTION

1. Field of the Invention

The present disclosure relates generally to air supply units for vehicles, such as automobiles. More specifically, the present disclosure relates to an integrated air supply unit for operating an air-lift suspension in a vehicle.

2. Related Art

Air suspension assemblies are known in the art for use on various vehicles, including automobiles. Air suspension assemblies typically include a plurality of air springs, each for interconnecting the body and one of the wheels of the automotive vehicle for damping relative forces between the body and the wheels, and for adjusting the height of the automotive vehicle. One example of such an air suspension assembly is disclosed in U.S. Pat. No. 5,465,209 to Sammut et al. The air suspension assembly includes a compressor for filling the air springs as well as a plurality of valves that are disposed between the compressor and the air springs and controlled by a controller for regulating airflow from the compressor to the air springs.

An air suspension assembly may include an air supply unit (ASU) that combines a compressor and dryer with an exhaust control valve. A separate Integrated Air Management Module (IAMM) may include control valves, a manifold pressure sensor, and a ECU in a single unit. The IAMM may communicate with the ASU through a pressure port, a boost port, and through one or more electrical connections.

Known air supply and management systems can be relatively pricey, bulky and complex in design. Accordingly, there remains a need for low-cost improvements to such air supply and management.

SUMMARY OF THE INVENTION

The present disclosure also provides an integrated air supply unit. The integrated air supply unit comprises a compressor housing that includes a piston slidably disposed within a piston bore. The integrated air supply unit also comprises a pressure control unit (PCU) body defining a plurality of fluid passages and a plurality of solenoid valves configured to selectively control airflow through corresponding ones of the plurality of fluid passages. The integrated air supply unit also comprises a desiccant housing extending between the compressor housing and the PCU body and defining a desiccant cavity configured to hold a desiccant container for removing moisture from air passing therethrough.

The present disclosure provides an integrated air supply unit that comprises: a manifold including at least one fluid passage; a discharge control valve configured to selectively control airflow from the manifold to a supply port for supplying pressurized air to an external device; a compressor configured to supply pressurized air in a first pressurized air passage; a dryer configured to remove moisture from the pressurized air in the first pressurized air passage and to supply dried pressurized air in a second pressurized air passage; and a supply control valve configured to configured to selectively control airflow between the second pressurized air passage and the manifold. The integrated air supply unit also comprises a piloted exhaust valve. The piloted exhaust valve includes an inlet passage and a discharge passage and is configured to control airflow therebetween. The piloted exhaust valve includes an exhaust valve bore having a semi-closed end, a tubular portion extending from the semi-closed end and into the exhaust valve bore, and a stepped piston that slidably movable within the exhaust valve bore. The stepped piston divides the exhaust valve bore between a first chamber and a second chamber. The stepped piston includes a control surface defining an end of the first chamber, and a lower surface opposite the control surface. The stepped piston also includes a piston extension that extends into the tubular portion. The piston extension includes a sealing face configured to selectively seal against a valve seat to block fluid communication between the inlet passage and the discharge passage. The integrated air supply unit also comprises a first exhaust control valve configured to selectively control flow of pressurized air from the second pressurized air passage to the first chamber of the piloted exhaust valve. The integrated air supply unit also comprises a second exhaust control valve configured to selectively control flow of pressurized air between the first chamber and the second chamber of the piloted exhaust valve. The inlet passage of the piloted exhaust valve is in direct fluid communication with the first pressurized air passage.

The present disclosure also provides an integrated air supply unit that comprises: a manifold including at least one fluid passage; a discharge control valve configured to selectively control airflow from the manifold to a supply port for supplying pressurized air to an external device; a compressor configured to supply pressurized air in a first pressurized air passage; a dryer configured to remove moisture from the pressurized air in the first pressurized air passage and to supply dried pressurized air in a second pressurized air passage; and a supply control valve configured to configured to selectively control airflow between the second pressurized air passage and the manifold. The integrated air supply unit also comprises a piloted exhaust valve. The piloted exhaust valve includes an inlet passage and a discharge passage and is configured to control airflow therebetween. The piloted exhaust valve includes an exhaust valve bore having a semi-closed end, a tubular portion extending from the semi-closed end and into the exhaust valve bore, and a stepped piston that slidably movable within the exhaust valve bore. The stepped piston divides the exhaust valve bore between a first chamber and a second chamber. The stepped piston includes a control surface defining an end of the first chamber, and a lower surface opposite the control surface. The stepped piston also includes a piston extension that extends into the tubular portion. The piston extension includes a sealing face configured to selectively seal against a valve seat to block fluid communication between the inlet passage and the discharge passage. The integrated air supply unit also comprises an exhaust control valve configured to selectively control flow of air between the first chamber and the second chamber of the piloted exhaust valve. The first chamber of the piloted exhaust valve is in direct fluid communication with the second pressurized air passage. The second chamber of the piloted exhaust valve is direct in fluid communication with an exhaust passage open to atmosphere. The inlet passage of the piloted exhaust valve is in direct fluid communication with the first pressurized air passage.

The present disclosure also provides an air pump. The air pump comprises a compressor housing and a sliding member. The compressor housing defines a stepped bore including a low-pressure bore having a first cross-sectional area and a high-pressure bore coaxial with the low-pressure bore and having a second cross-sectional area smaller than the first cross-sectional area. The sliding member includes a low-pressure piston slidably disposed in the low-pressure bore and a high-pressure piston slidably disposed in the high-pressure bore. The sliding member defines a hollow cavity between the low-pressure piston and the high-pressure piston. The air pump also includes articulating member disposed within the hollow cavity of the sliding member and pivotably coupled thereto by a wrist pin.

BRIEF DESCRIPTION OF THE DRAWINGS

Further details, features and advantages of designs of the invention result from the following description of embodiment examples in reference to the associated drawings.

FIG. 1A shows a perspective view of an Integrated Air Supply Unit of the present disclosure;

FIG. 4C shows a perspective view of the desiccant housing of FIG. 4A, with partial transparency to show internal components;

FIG. 7A shows a first cross-sectional view of a compressor assembly of the Integrated Air Supply Unit of the present disclosure;

FIG. 7B shows a second cross-sectional view of the compressor assembly through a plane perpendicular to the first cross-sectional view of FIG. 7A;

DESCRIPTION OF THE ENABLING EMBODIMENTS

Figure 1C:
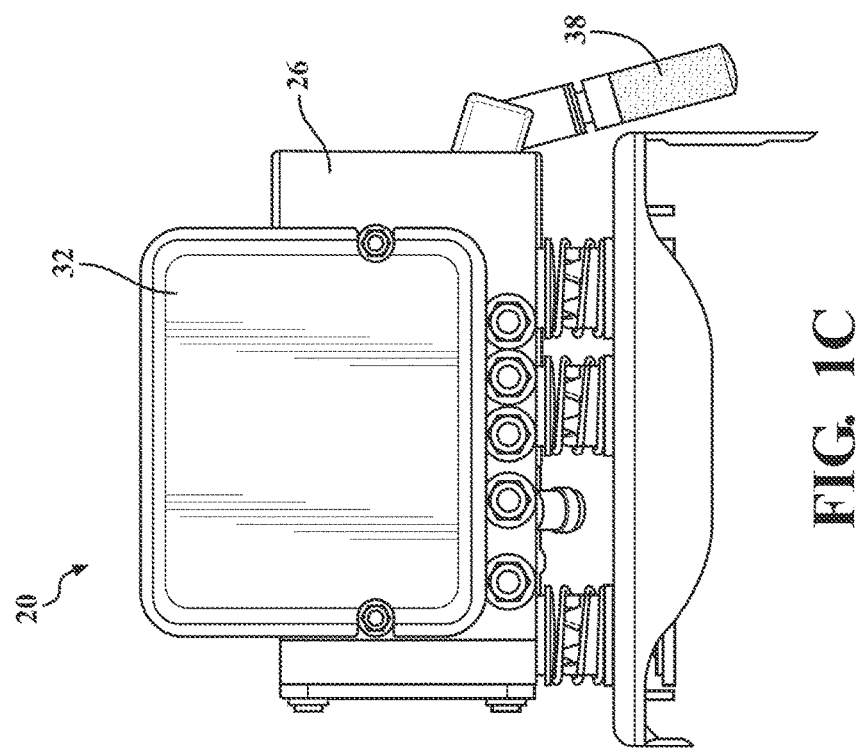
FIG. 1C shows a side view of the Integrated Air Supply Unit of FIG. 1A.

Referring to the drawings, the present invention will be described in detail in view of following embodiments.

Figure 1B:
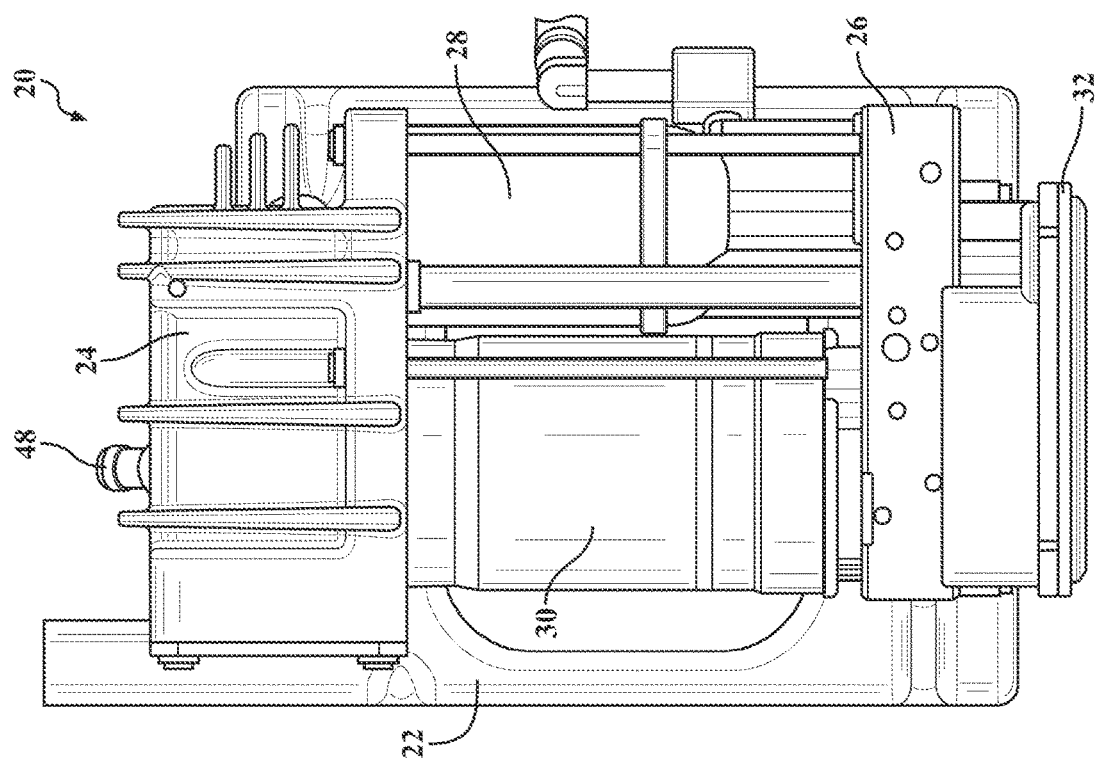
FIG. 1B shows a top view of the Integrated Air Supply Unit of FIG. 1A.

FIGS. 1A-1C show various views of an Integrated Air Supply Unit (IASU) 20, which may be installed in a vehicle for operating an air-lift suspension in the vehicle. The IASU 20 of the present disclosure may combine a compressor, dryer, exhaust control valves, and an Integrated Air Management Module (IAMM) in an integrated assembly. The IASU 20 of the present disclosure may be more compact and have a lower weight than conventional air supply units.

The IASU 20 includes a mounting bracket 22 to which the remaining components are attached. The mounting bracket 22 may include a foundation, such as a baseplate, and mounting structures, such as tabs, flanges, holes, etc. for attachment to one or more vehicle structures. The mounting bracket 22 may be customized for a particular vehicular application, whereas other components of the IASU 20 may be standardized. The IASU 20 also includes a compressor housing 24, a pressure control unit (PCU) body 26, a desiccant housing 28, a motor assembly 30, an electronic control unit (ECU) 32, an exhaust muffler 38, and an air intake hose 46.

Figure 2:
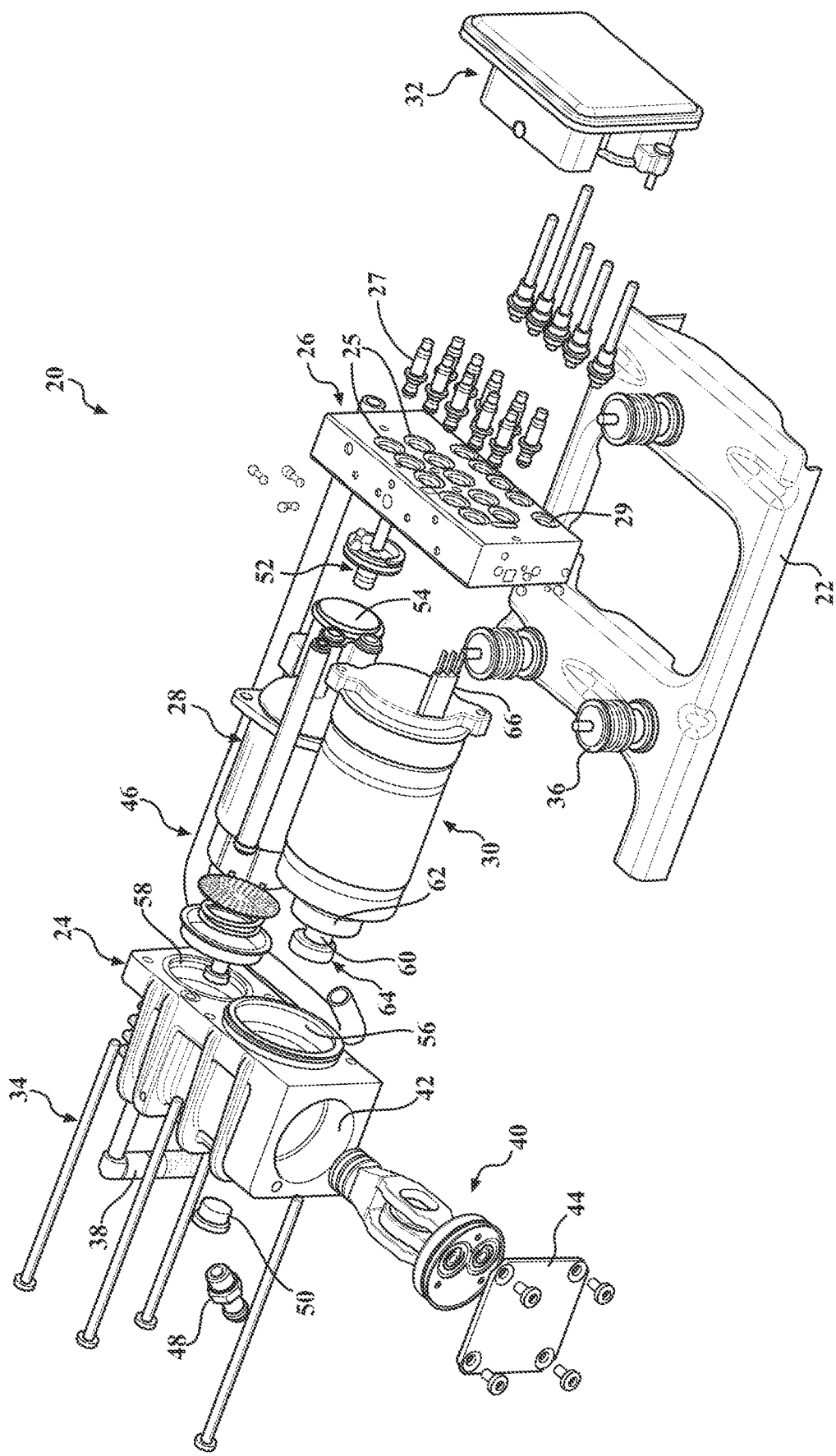
FIG. 2 shows an exploded view of the Integrated Air Supply Unit of FIG. 1A.

FIG. 2 shows an exploded view of the IASU 20, including tie-rod bolts 34 that join the compressor housing 24, the desiccant housing 28, the motor assembly 30, and the PCU body 26. Three isolation mounts 36 are attached to the mounting bracket 22 for holding corresponding ones of the compressor housing 24 and the PCU body 26, while preventing vibrations from being transmitted from the compressor housing 24 to the mounting bracket 22. It should be appreciated that this is merely an example configuration, and the mounting bracket 22 may have a different size or shape, and the IASU 20 may include any number of the isolation mounts 36 in any configuration.

FIG. 2 also shows an exhaust muffler 38 attached to the compressor housing 24, and a dual piston assembly 40 that fits within a stepped bore 42 of the compressor housing 24. The stepped bore 42 is enclosed by a low-pressure chamber cover 44 that overlies a corresponding face of the compressor housing 24 and is attached thereto with screws. An intake hose barb 48 screws into the compressor housing 24 for fluidly coupling to the air intake hose 46. A service cap 50 screws into a corresponding port (not shown in FIG. 2) in the compressor housing 24 to provide access to the stepped bore 42.

The PCU body 26 may include a block of material, such as machined aluminum, defining a plurality of fluid passages (not shown on FIG. 2). The PCU body 26 may include a plurality of solenoid bores 25, each receiving a corresponding valve core 27. The valve cores 27 may each cooperate with corresponding fluid passages to form solenoid valves that are configured to selectively control airflow through the corresponding fluid passages. The PCU body 26 also defines a plurality of air ports 29 providing fluid communication to transmit air to/from external devices, such as air springs and/or an external air reservoir.

A piloted exhaust valve 52 is coupled to the PCU body 26 and fits within a corresponding exhaust valve bore 54 of the desiccant housing 28. The compressor housing 24 defines a motor bore 56 for receiving the motor assembly 30. The compressor housing 24 also defines a desiccant bore 58 for receiving the desiccant housing 28. Each of the motor bore 56 and the desiccant bore 58 are defined in a common face of the compressor housing 24 adjacent to one another and each extend perpendicular to the stepped bore 42.

The motor assembly 30 includes a motor shaft 60 having a main shaft bearing 62 disposed thereabout, and an eccentric bearing 64 located on an end thereof. A power connector 66 extends out of an end of the motor assembly 30 opposite from the eccentric bearing 64 and extents through a corresponding hole in the PCU body 26 to plug into the ECU 32.

Figure 3A:
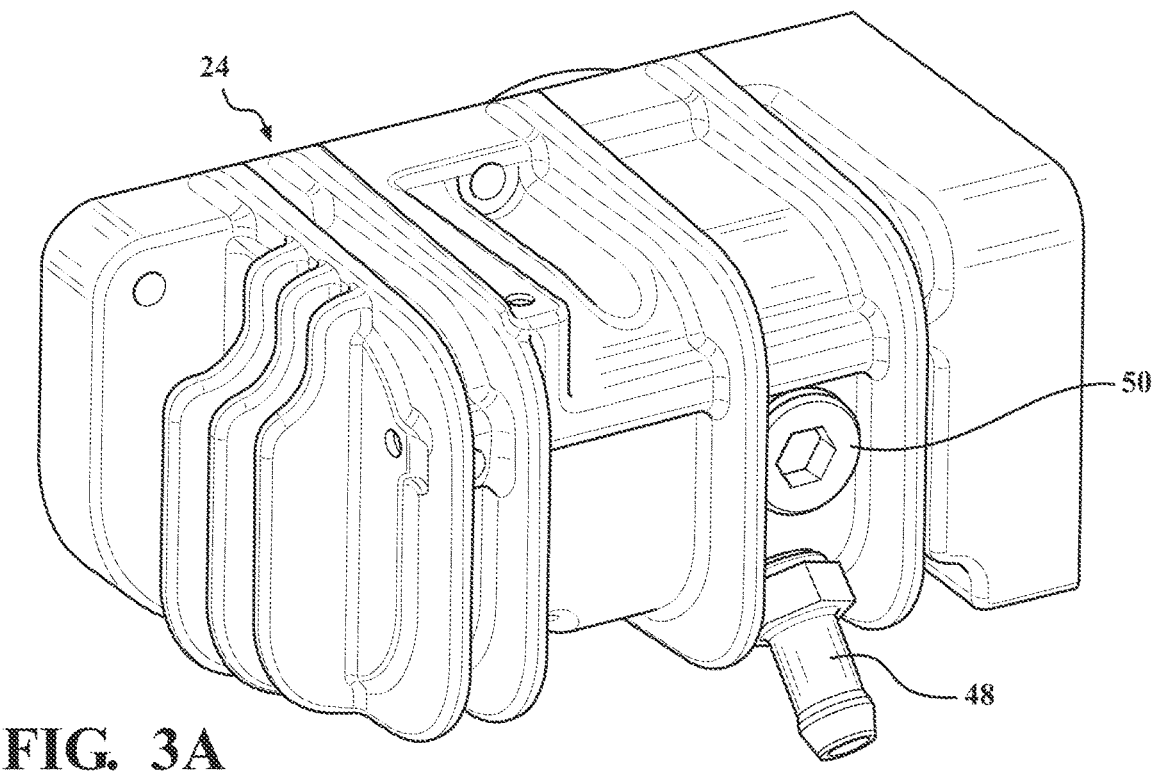
FIGS. 3A-3B each show perspective views of a compressor housing of the Integrated Air Supply Unit of the present disclosure.
Figure 3B:
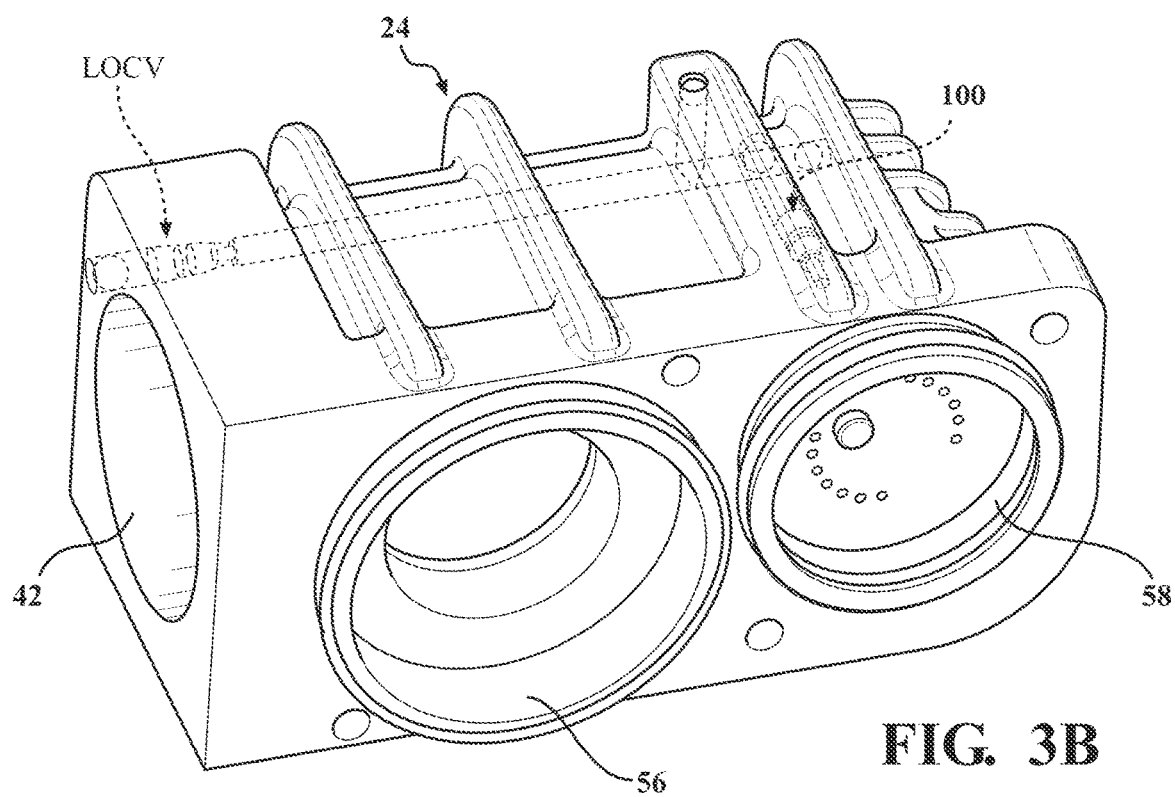

FIGS. 3A-3B show additional details of the compressor housing 24, including various integrally formed cooling fins, and showing attachment of the intake hose barb 48 and the service cap 50. FIG. 3B shows the compressor housing 24 as partially transparent to illustrate internal components including a low-pressure outlet check valve LOCV and a high-pressure outlet check valve HOCV that are integrated therein.

Figure 4A:
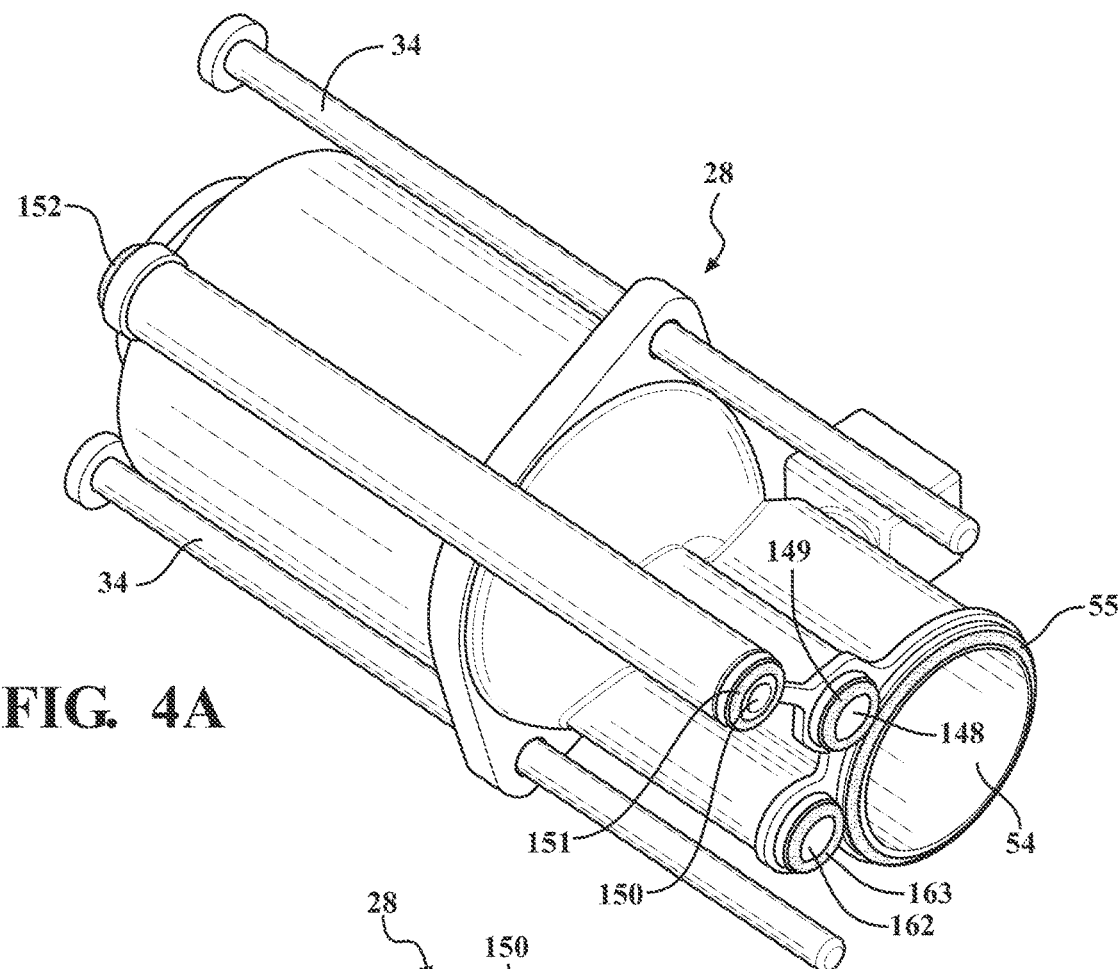
FIG. 4A shows a perspective view of a desiccant housing of the Integrated Air Supply Unit of the present disclosure.
Figure 4B:
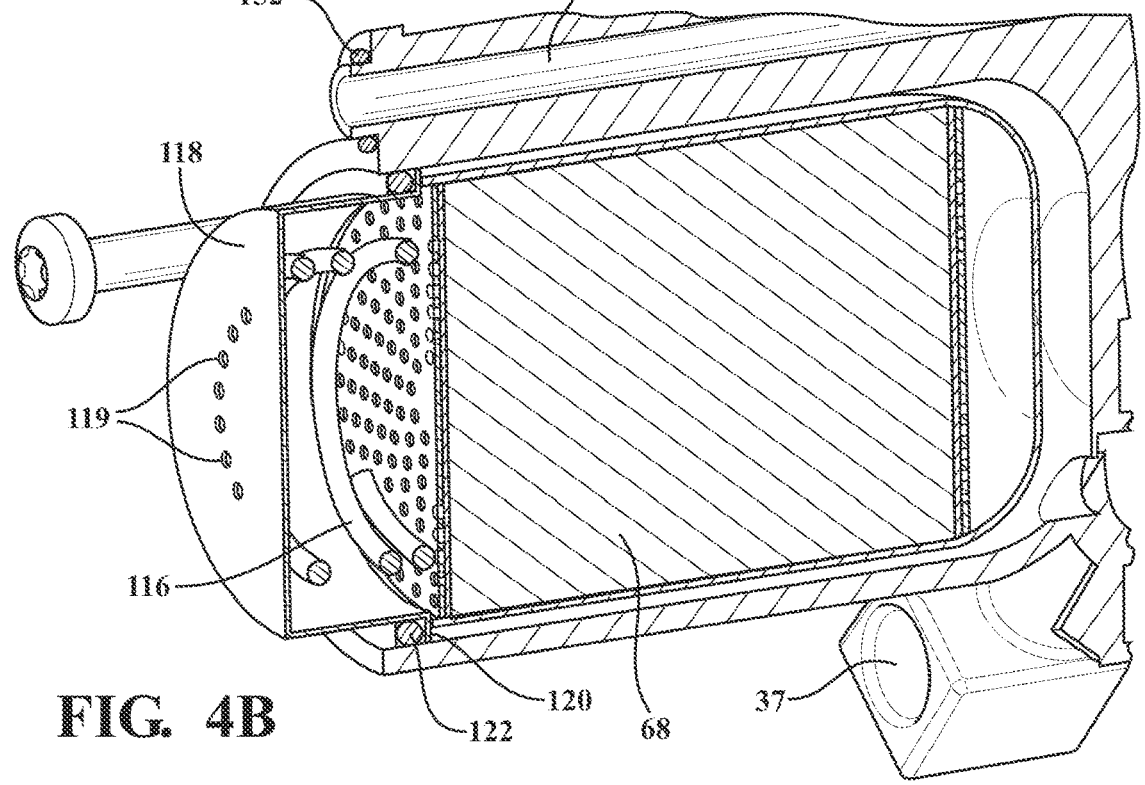
FIG. 4B shows a cut-away fragmentary view of the desiccant housing of FIG. 4A.

FIGS. 4A-4C show various views of the desiccant housing 28, including radial O-ring seals 55, 149, 151, 163 for sealing the exhaust valve bore 54 and the passageways 148, 150, 162, respectively, on a common face of the PCU body 26. A desiccant container 68 containing desiccant material and filters is disposed within the desiccant housing 28. The desiccant housing 28 defines a through-bore 150, which extends between and fluidly connects the compressor housing 24 and the PCU body 26. The through-bore 150 may also be called a boost passageway. The desiccant housing 28 also defines an exhaust passage 37 for conveying exhaust air to the exhaust muffler 38. A compressor-side radial O-ring seal 152 is shown on FIG. 4B for sealing the through-bore 150 of the desiccant housing 28 to the compressor housing 24.

Figure 5:
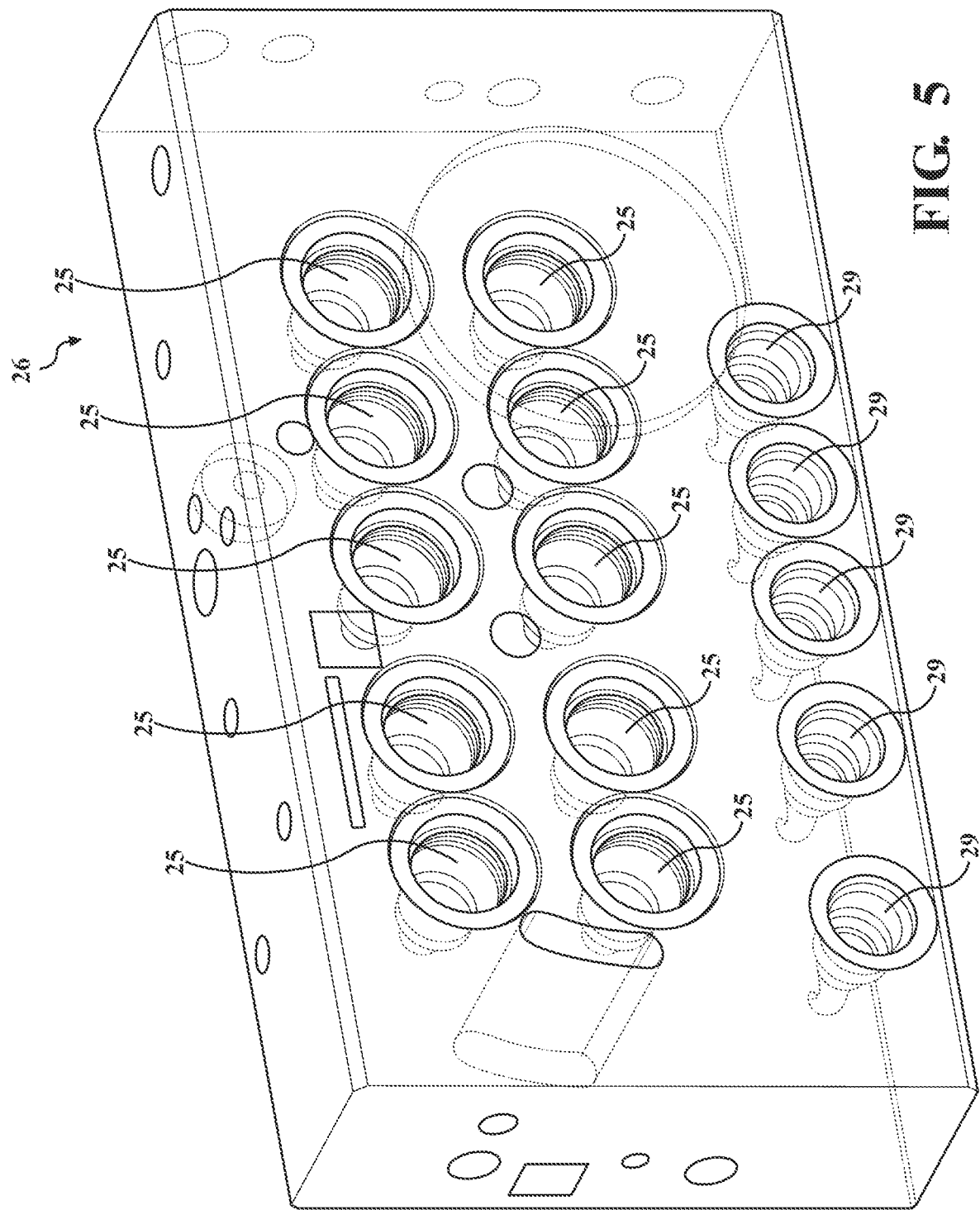
FIG. 5 shows a perspective view of a pressure control unit (PCU) body, with partial transparency to show internal components.
Figure 6C:
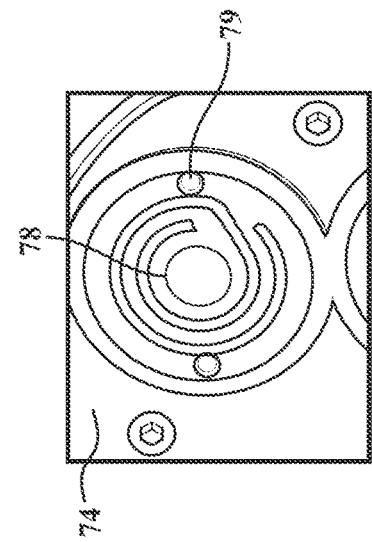
FIG. 6C shows a perspective view of the dual piston assembly of FIG. 6A, with additional components attached thereto.
Figure 6D:
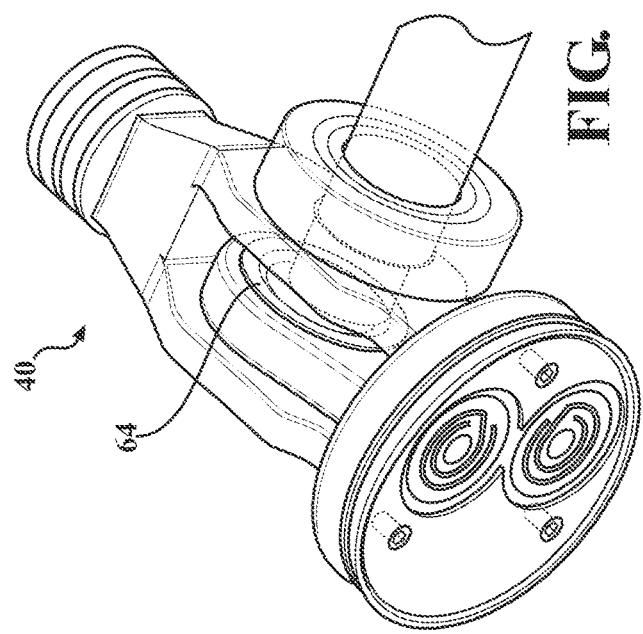
FIG. 6D shows a fragmentary view including a reed valve of the dual piston assembly of FIG. 6A.
Figure 6A:
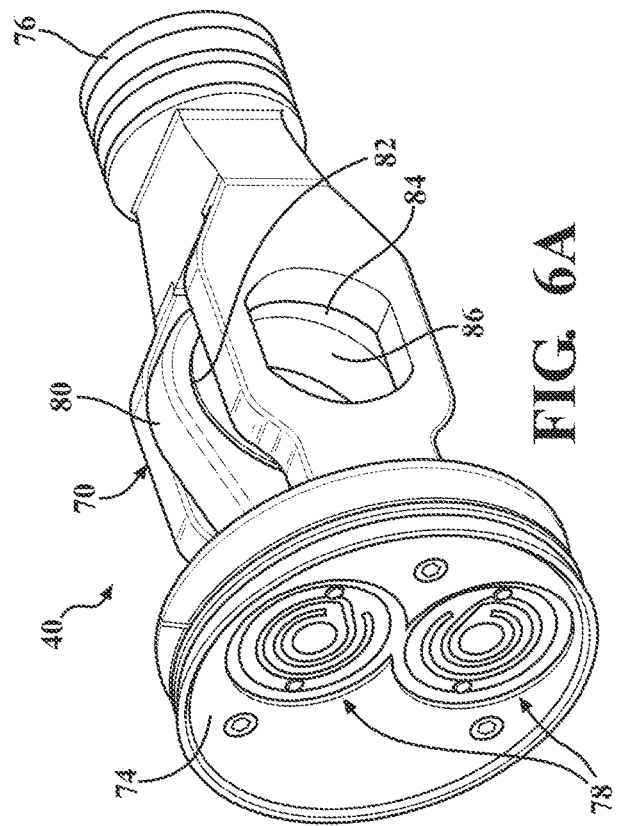
FIG. 6A shows a perspective view of a dual piston assembly of the Integrated Air Supply Unit of the present disclosure.
Figure 6B:
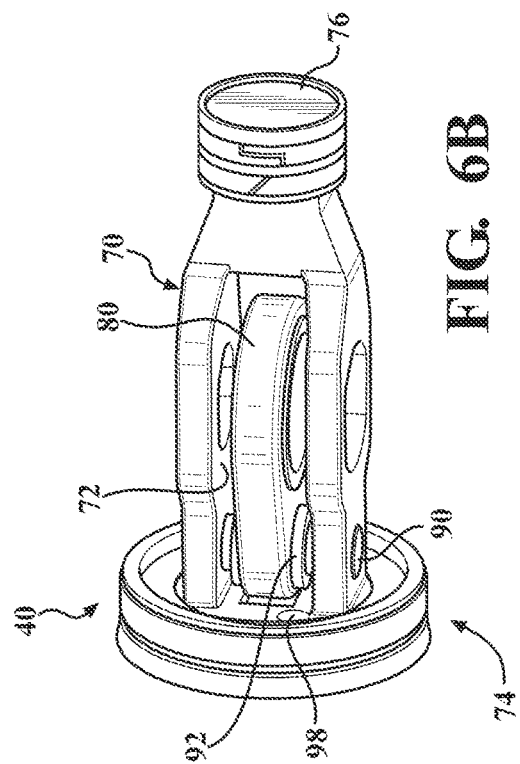
FIG. 6B shows a top view of the dual piston assembly of FIG. 6A.

FIG. 5 shows details of the pressure control unit (PCU) body 26, including the solenoid bores 25 and the plurality of air ports 29 all disposed on a common face of the PCU body 26.

FIGS. 6A-6D show various views of the dual piston assembly 40, which includes a sliding member 70. The sliding member 70 includes a low-pressure piston 74 and a high-pressure piston 76 located on opposite ends thereof.

The sliding member 70 also includes a central portion extending between the pistons 74, 76 and defines a central cavity 72 located between the low-pressure piston 74 and the high-pressure piston 76. The sliding member 70 may be made of cast and/or machined aluminum, although other materials may be used. The low-pressure piston 74 includes two reed-type valves 78 located on a face thereof, and which are retained thereupon by rivets 79. The reed-type valves may allow air to flow through the low-pressure piston 74 in one direction while blocking airflow in an opposite direction. The high-pressure piston 76 may also include one or more of the reed-type valves 78, and the reed-type valves 78 may be retained on the low-pressure piston 74 and/or the high-pressure piston 76 by other fastening means, such as using one or more fasteners, an adhesive, and/or by welding.

Still referring to FIGS. 6A-6D, the dual piston assembly 40 also includes an articulating member 80 disposed in the central cavity 72. The articulating member 80 defines a large bore 82 holding a steel wear sleeve 84. The steel wear sleeve 84 may be fixed within the large bore 82, e.g. by a press fit. It should be appreciated that the steel wear sleeve 84 is not necessarily made of steel, and may include one or more other materials suitable for the application.

The articulating member 80 may be made of cast aluminum, although other materials may be used. The steel wear sleeve 84 defines a cylindrical interior surface 86 for receiving the eccentric bearing 64 in a press fit. The articulating member 80 is pinned to move axially with the sliding member 70 by a wrist pin 90 and a pin bushing 92. The wrist pin 90 passes through the sliding member 70 and permits the sliding member 70 to articulate through a defined arc length. Together, the eccentric bearing 64, the wrist pin 90, and the articulating member 80 convert rotational motion of the motor shaft 60 into reciprocal linear motion of the sliding member 70.

FIGS. 7A-7B show cross-sections of the compressor assembly within the compressor housing 24 of the IASU 20. As shown on FIG. 7A, the stepped bore 42 includes a low-pressure bore 42*l* and a high-pressure bore 42*h* that are coaxial with one another. The low-pressure bore 42*l* has a first cross-sectional area, and the low-pressure bore 42*l* has a second cross-sectional area that is smaller than the first cross-sectional area. In some embodiments, and as shown in the FIGs., the low-pressure bore 42*l* and the high-pressure bore 42*h* each have circular cross-sections, and the first cross-sectional area of the low-pressure bore can be represented by a circle having a larger diameter than a diameter of the high-pressure bore 42*h*. The low-pressure piston 74 is slidably disposed in the low-pressure bore 42*l*, and the high-pressure piston 76 is slidably disposed in the high-pressure bore 42*h*. The compressor assembly of the IASU 20 of the present disclosure provides two-stage air pump (compressor) with a one-piece sliding member 70. The sliding member 70 includes low-pressure piston 74 and the high-pressure piston 76 coupled together and configured to slide along a common axis through the stepped bore 42.

The low-pressure piston 74 includes a first sealing member 75 incorporated therein for providing an airtight seal with the low-pressure bore 42*l*, and the high-pressure piston 76 includes a second sealing member 77 incorporated therein for providing an airtight seal with the high-pressure bore 42*h*. The sealing members 75, 77 may be circumferentially disposed about the corresponding one of the pistons 74, 76, as shown in FIG. 7A. Either or both of the sealing members 75, 77 may provide airtight seals for pressures in a range of 0-50 bar.

FIG. 7A also shows the motor shaft 60 that includes an eccentric shaft extension 94, with the eccentric bearing 64 disposed thereabout. The eccentric bearing 64 may be fixed onto the eccentric shaft extension 94, e.g. by a press fit. The eccentric shaft extension 94 is offset from a rotational axis of the motor shaft 60 by some distance. For example, the eccentric shaft extension 94 may be offset from the rotational axis of the motor shaft 60 by 2 millimeters to 6 millimeters. FIG. 7A also shows the compressor housing 24 defining the motor bore 56, which is transverse to the stepped bore 42. A main bearing 62 is disposed in the motor bore 56 and supported therein for supporting the motor shaft 60, while allowing the motor shaft 60 to rotate. The compressor housing 24 also includes a boss 96 that is transverse to the stepped bore 42 and collinear with the motor bore 56. The boss 96 is configured to receive and retain a motor housing 31 of the motor assembly 30. A sealing member 97, such as an O-ring, extends around the boss 96 and seals against the motor housing to provide a seal therebetween.

FIG. 7A also shows an interface between the compressor housing 24 and the desiccant housing 28, including an outlet check valve 100 including an elastomeric member 101 configured to selectively seal against a seat surface 102 of the compressor housing 24 and to selectively block airflow through a fluid passage 104 that is in fluid communication with an end of the high-pressure bore 42*h*. A coil spring 106 biases the elastomeric member 101 against the seat surface 102 of the compressor housing 24. The outlet check valve 100 may allow air to flow out of the compressor housing 24 and into the desiccant housing 28 while blocking airflow in an opposite direction.

FIG. 7B shows a second cross-sectional view of the compressor assembly through a plane perpendicular to the first cross-sectional view of FIG. 7A. As shown in FIG. 7B, the low-pressure piston 74 includes two passages 98 extending therethrough. Each of the passages 98 may be covered by a corresponding one of the reed-type valves 78 (not shown on FIG. 7B).

Figure 8A:
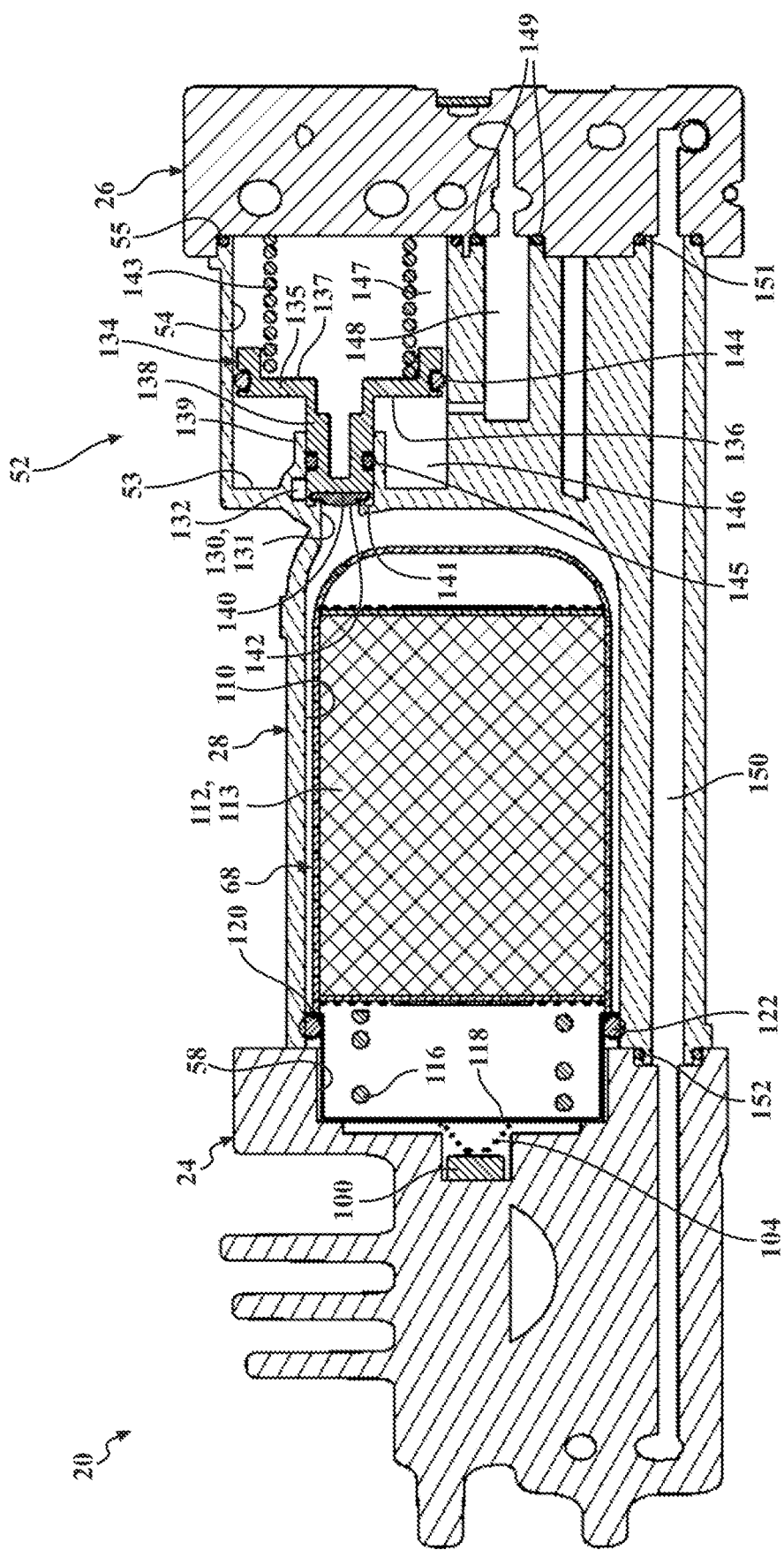
FIGS. 8A-8C each show cross-sectional views of a dryer assembly of the Integrated Air Supply Unit of the present disclosure.
Figure 8B:
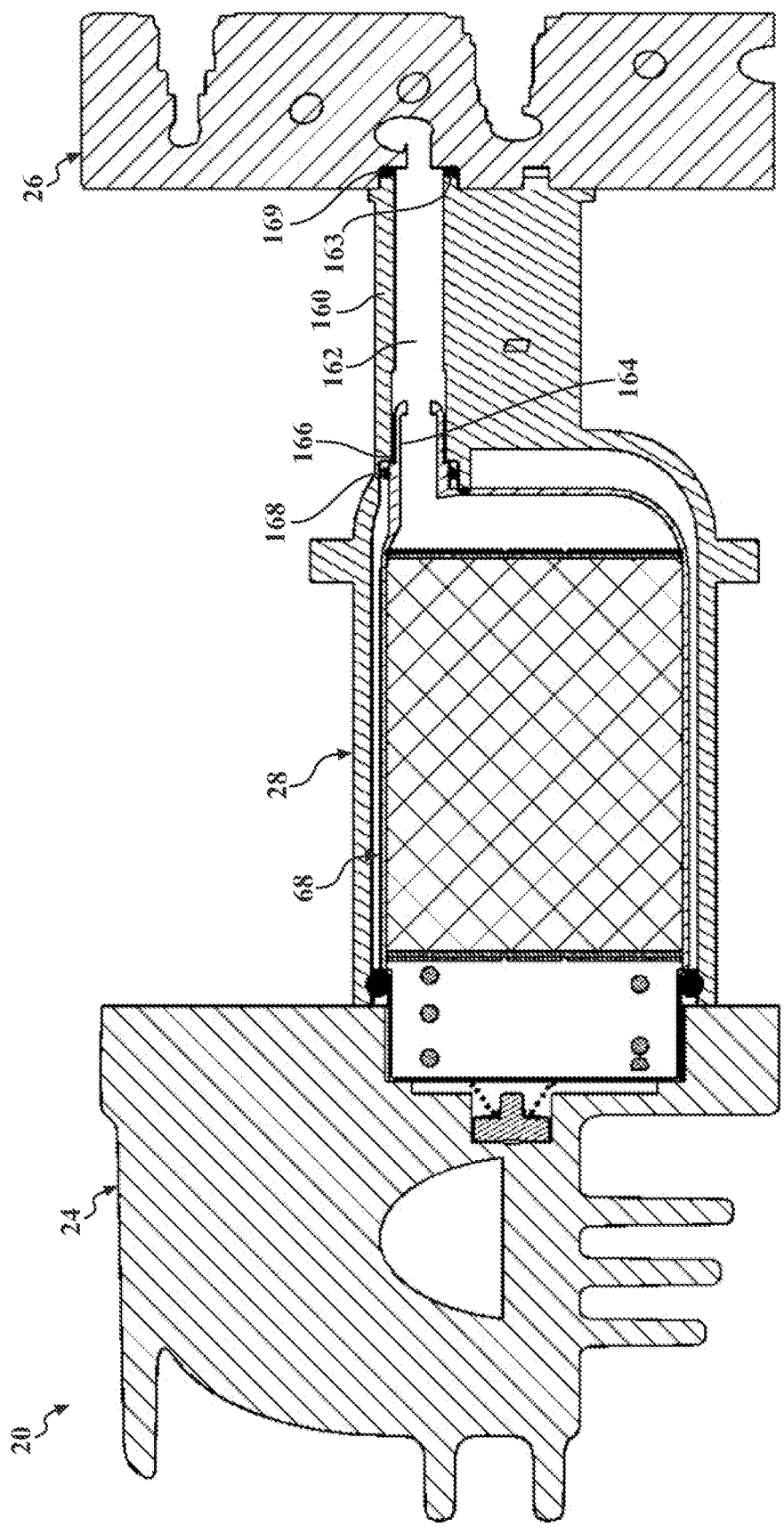
Figure 8C:
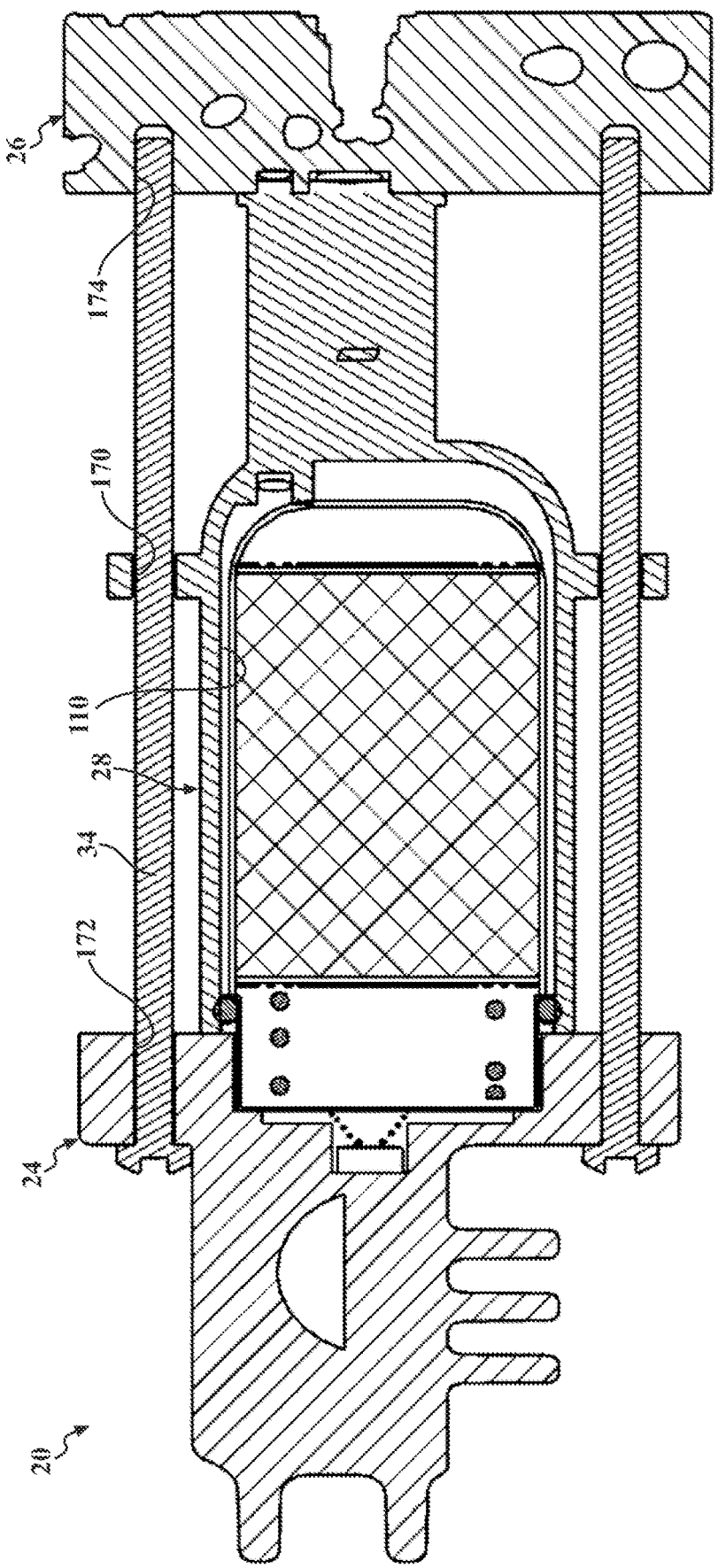

FIGS. 8A-8C show cross-sections of the desiccant housing 28 of the IASU 20. The desiccant housing 28 includes a desiccant-type dryer assembly to remove moisture from incoming air and to recharge the desiccant from outgoing air. The desiccant housing 28 may be constructed from injection molded plastic, although other materials may be used. As shown in FIG. 8A, the desiccant housing 28 extends between the compressor housing 24 and the PCU body 26.

The desiccant housing 28 defines a desiccant cavity 110 holding desiccant container 68 therein. The desiccant container 68 has a cup-like, cylindrical shape, and the desiccant cavity 110 has a cylindrical shape sufficiently large enough to create an airflow gap between the desiccant container 68 and an inner surface thereof. The desiccant container 68 includes at least one perforated retainer 112 having a thin, cylindrical shape, and at least one filter 113 having a thin cylindrical shape for retaining desiccant material therein.

A desiccant spring 116 is located at one end of the desiccant container 68 and presses against an end of the desiccant bore 58 in the compressor housing 24. The desiccant spring 116 may be configured to exert force on the desiccant material in the desiccant container 68 sufficient to keep the desiccant material firmly compacted during periods of high flow. A desiccant retainer 118 having a cup shape is located between the compressor housing 24 and the desiccant spring 116. The desiccant retainer 118 includes an annular flange 120, with an O-ring seal 122 located between the annular flange 120 and the compressor housing 24 to provide an airtight seal therebetween. As best shown in FIG. 4B, the desiccant retainer 118 includes an end surface defining a plurality of intake holes 119 for transmitting air from the compressor housing 24 into the desiccant container 68.

Referring back to FIG. 8A, the desiccant housing 28 defines an offset bore 130 to provide an exhaust flow out of the desiccant cavity 110. The offset bore 130 may extend parallel to and offset from a central axis of the desiccant cavity 110. The piloted exhaust valve 52 controls the flow of exhaust air out of the desiccant cavity 110 via the offset bore 130. The desiccant housing 28 defines exhaust valve bore 54 with a cup shape including a semi-closed end 53. A tubular portion 139 extends from the semi-closed end 53 and into the exhaust valve bore 54

The piloted exhaust valve 52 includes an inlet passage 131 and a discharge passage 132. In some embodiments, and as shown in FIG. 8A, the offset bore 130 of the desiccant housing 28 defines the inlet passage 131 of the piloted exhaust valve 52. However, the piloted exhaust valve 52 may have another configuration or arrangement, which may be in a different part of the desiccant housing 28 or spaced apart from the desiccant housing 28.

The piloted exhaust valve 52 includes a stepped piston 134 that is disposed within the exhaust valve bore 54 and is slidably movable therein. The stepped piston 134 includes a large-diameter portion 135 that spans the exhaust valve bore 54 and divides the exhaust valve bore 54 into a first chamber 146 and a second chamber 147, with the first chamber 146 extending between the large-diameter portion 135 and the semi-closed end 53. The large-diameter portion 135 of the stepped piston 134 includes a control surface 136 that defines an end of the first chamber 146. The large-diameter portion 135 of the stepped piston 134 also includes a lower surface 137 opposite the control surface 136. The stepped piston 134 also includes a piston extension 138 that extends from the control surface 136 and into the tubular portion 139. The piston extension 138 includes a sealing face 140 configured to selectively seal against a valve seat 141, blocking fluid communication between the inlet passage 131 and the discharge passage 132. The large-diameter portion 135 of the stepped piston 134 includes a first groove 144 holding a corresponding O-ring configured to seal against the exhaust valve bore 54. The piston extension 138 of the stepped piston 134 includes a second groove 145 holding a corresponding O-ring configured to seal against an inner surface of the tubular portion 139.

In some embodiments, and as shown in FIG. 8A, an elastomeric seal 142 is disposed over the sealing face 140 to provide an airtight seal with the valve seat 141. A valve spring 143 is disposed within the second chamber 147 and configured to bias the sealing face 140 of the stepped piston 134 against the valve seat 141. This may make the piloted exhaust valve 52 a normally-closed valve. The valve spring 143 may act against a face of the PCU body 26, as shown in FIG. 8A, although other physical configurations may be possible.

In operation, the stepped piston 134 is configured to move away from the semi-closed end 53 in response to air pressure in the first chamber 146 acting on the control surface 136 overcoming a sum of a first force of air pressure in the second chamber 147 acting on the lower surface 137 and the biasing force of the valve spring 143, thereby causing the sealing face 140 to be pulled away from the valve seat 141, and providing fluid communication between the inlet passage 131 and the discharge passage 132.

Figure 10:
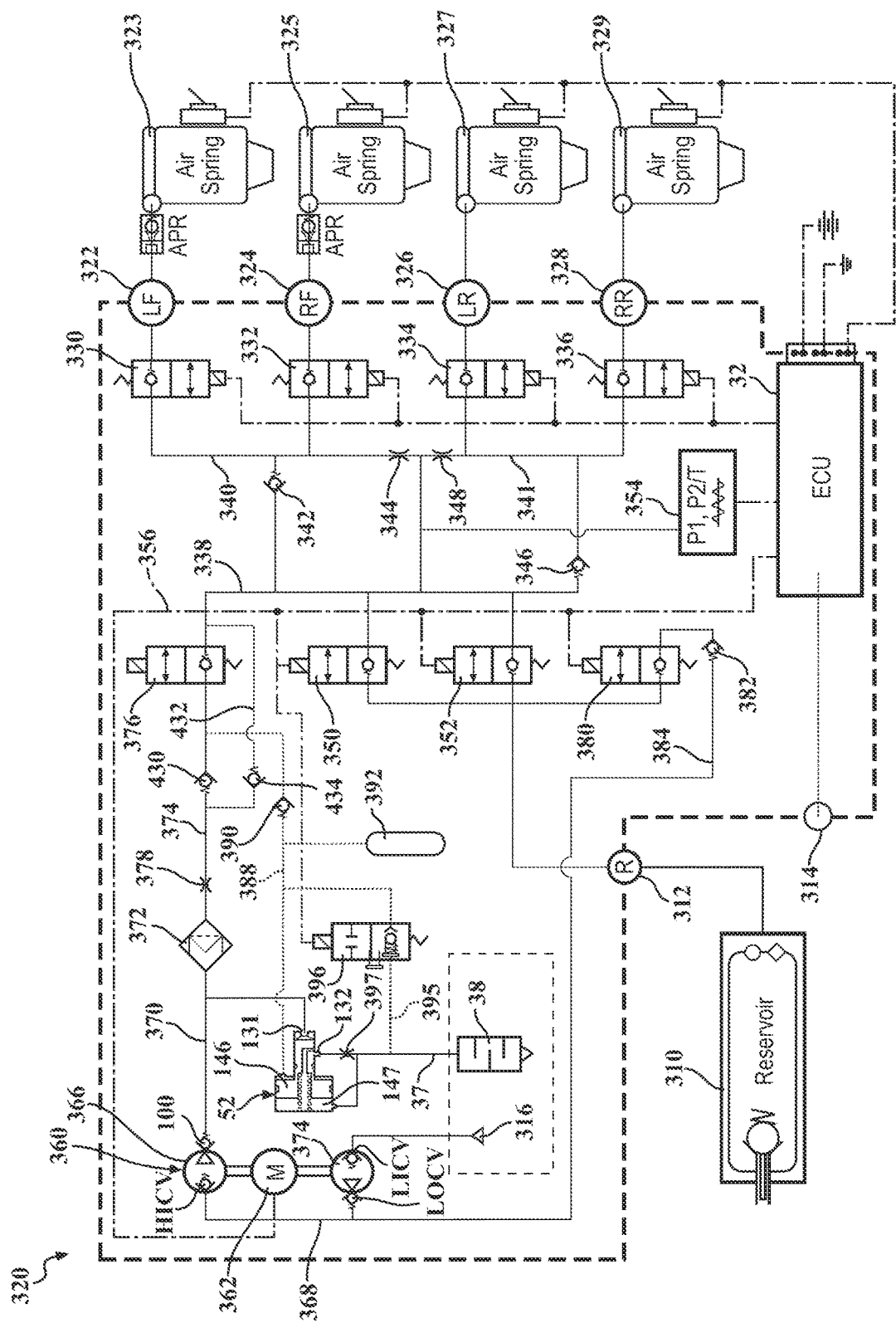
FIG. 10 shows a schematic diagram of a second arrangement for an Integrated Air Supply Unit of the present disclosure.

In some embodiments and as shown, for example, in FIG. 10, the second chamber 147 of the piloted exhaust valve 52 is in fluid communication with an exhaust passage 37 that is open to atmosphere.

In some embodiments, the stepped piston 134 may have an area ratio between the lower surface 137 and the sealing face 140, which may be in a range of 8 to 11. In other words, the lower surface 137 may be between 8 and 11 times larger in area than the sealing face 140.

The desiccant housing 28 also defines a control passageway 148 configured to provide fluid communication between the PCU body 26 and the first chamber 146 for transmitting air to control operation of the piloted exhaust valve 52.

As also shown in FIG. 8A, the desiccant housing 28 also defines a through-bore 150 that is configured to provide direct fluid communication between the compressor housing and the PCU body 26. The through-bore 150 is sealed against the PCU body 26 on one end by a first radial O-ring seal 151. An opposite end of the through-bore 150 is sealed against the compressor housing 24 end by a second radial O-ring seal 152. The through-bore 150 may provide a pneumatic connection between the boost solenoid valve in the PCU body 26 and the low-pressure outlet check valve LOCV and high-pressure inlet check valve HICV in the compressor housing 24.

FIG. 8B shows a cross-section of the dryer assembly of the IASU 20, through a plane parallel to and spaced apart from the cross-section shown in FIG. 8A. As shown in FIG. 8B, the desiccant housing 28 includes a protrusion 160 defining a through-hole 162. The through-hole 162 may extend parallel to and offset from a central axis of the desiccant cavity 110. A radial O-ring seal 163 is disposed on the protrusion 160 of the desiccant housing 28 around the through-hole 162 and configured to fit within a corresponding recess 169 in a face of the PCU body 26 for sealing therewith.

The desiccant container 68 includes a tubular protrusion 164 configured to fit into the through-hole 162 with a sealing fit to provide fluid communication between an interior space thereof and the corresponding recess 169 in the PCU body 26 via the through-hole 162. An O-ring 168 is disposed around the tubular protrusion 164 and configured to seal with a corresponding step 166 in the protrusion 160 of the desiccant housing 28.

FIG. 8C shows a cross-section of the dryer assembly of the IASU 20, through a plane parallel to and spaced apart from the cross-sections shown in FIGS. 8A and 8B. As shown in FIG. 8C, the desiccant housing 28 defines a guide hole 170 that is sufficiently large to act as a guide for one of the tie-rod bolts 34 that physically hold the compressor housing 24 to the PCU body 26. More specifically, the guide hole 170 in the desiccant housing 28 is aligned with a first bolt hole 172 in the compressor housing 24 and with a threaded bore 174 in the PCU body 26 to provide sufficiently strong retention between the compressor housing 24 and the PCU body 26.

Figure 9:
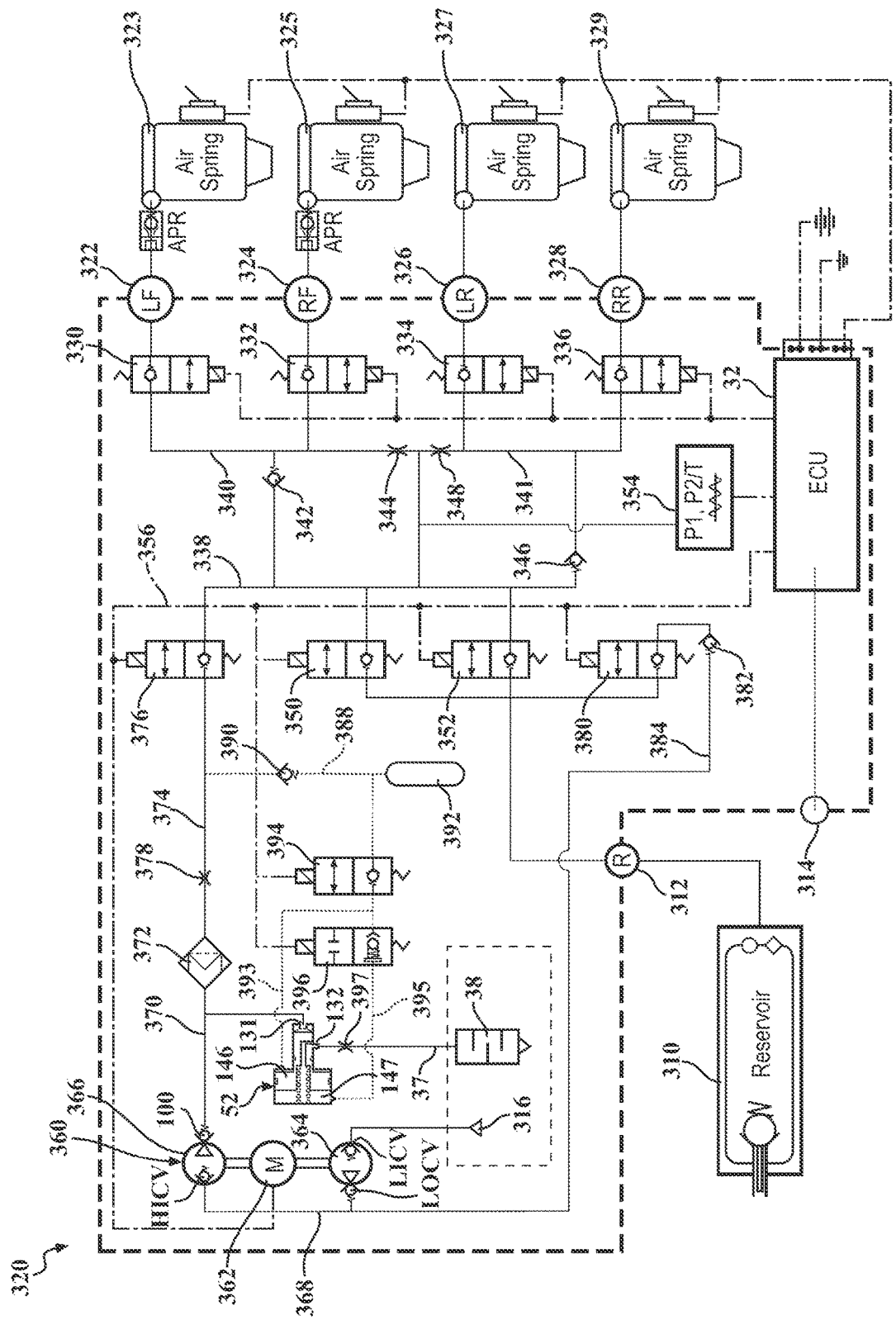
FIG. 9 shows a schematic diagram of a first arrangement for an Integrated Air Supply Unit of the present disclosure.

FIG. 9 shows a schematic diagram of a first arrangement 320 of the IASU 20. As shown in FIG. 9, the first arrangement 320 includes four supply ports 322, 324, 326, 328, including a left-front supply port 322, a right-front supply port 324, a left-rear supply port 326, and a right-rear supply port 328. Each of the supply ports 322, 324, 326, 328 is fluidly coupled to supply air to a corresponding air spring 323, 325, 327, 329, including a left-front air spring 323, a right-front air spring 325, a left-rear air spring 327, and a right-rear air spring 329. Each of the air springs 323, 325, 327, 329 may be connected to a corresponding wheel of a vehicle. In some embodiments, an auxiliary pressure relief valve APR may be connected to the air lines of one or more of the air springs 323, 325, 327, 329.

The first arrangement 320 also includes discharge control valves 330, 332, 334, 336 corresponding to each of the air springs 323, 325, 327, 329. Each of the discharge control valves 330, 332, 334, 336 is configured to selectively control airflow from a manifold 338 to a corresponding supply port 322, 324, 326, 328 for supplying pressurized air to an external device, such as a corresponding one of the air springs 323, 325, 327, 329. The manifold 338 includes at least one fluid passage. In some embodiments, the manifold 338 may include a plurality of passages, such as bores in a PCU body 26, in fluid communication with one another.

Each of the discharge control valves 330, 332, 334, 336 may be normally-closed solenoid valves. The discharge control valves 330, 332, 334, 336 may include: a left-front control valve 330, controlling airflow to and from the left-front air spring 323 via the left-front supply port 322; a right-front control valve 332, controlling airflow to and from the right-front air spring 325 via the right-front supply port 324; a left-rear control valve 334, controlling airflow to and from the left-rear air spring 327 via the left-rear supply port 326; and a right-rear control valve 336, controlling airflow to and from the right-rear air spring 329 via the right-rear supply port 328. The left-front control valve 330 and the right-front control valve 332 are each fluidly connected to a front-side air passage 340, and the left-rear control valve 334 and the right-rear control valve 336 are each fluidly connected to a rear-side air passage 341.

The front-side air passage 340 is fluidly connected to the manifold 338 via a front-side check valve 342 that provides airflow from the manifold 338 to the front-side air passage 340, while blocking airflow in an opposite direction. The front-side air passage 340 is also fluidly connected to the manifold 338 via a front-side orifice 344 that provides a limited amount of airflow between the manifold 338 and the front-side air passage 340 in either direction. The rear-side air passage 341 is fluidly connected to the manifold 338 via a rear-side check valve 346 that provides airflow from the manifold 338 to the rear-side air passage 341, while blocking airflow in an opposite direction. The rear-side air passage 341 is also fluidly connected to the manifold 338 via a rear-side orifice 348 that provides a limited amount of airflow between the manifold 338 and the rear-side air passage 341 in either direction.

A reservoir 310 is fluidly connected to a reservoir port 312 in the first arrangement 320 of the IASU 20 shown in FIG. 9. The reservoir 310 may be external to the IASU 20, as shown in FIG. 9. Alternatively, the reservoir 310 may be integrally constructed with the IASU 20. At least one reservoir valve 350, 352 is configured to selectively provide fluid communication between the reservoir port 312 and the manifold 338. In some embodiments, and as shown in FIG. 9, the At least one reservoir valve 350, 352 includes a first reservoir valve 350 and a second reservoir valve 352 in a parallel configuration, with the reservoir valves 350, 352 each having different flow characteristics. For example, the first reservoir valve 350 may be relatively small to allow opening at high delta pressures between the reservoir 310 and manifold 338 to balance pressures therebetween, and the second reservoir valve 352 may substantially larger than the first reservoir valve 350 to allow relatively high airflow rates therethrough.

The first arrangement 320 of the IASU 20 also includes a manifold pressure sensor 354 measures the pressure in the manifold 338. The first arrangement 320 of the IASU 20 also includes an electronic control unit (ECU) 32 configured to control several electrical devices, such as control valves 330, 332, 334, 336, 350, 352, 376, 380, 394, 396 and an electric motor 362 via corresponding electrical conductors 356. The ECU 32 may also monitor one or more sensors, such as the manifold pressure sensor 354, and position sensors on one or more of the air springs 323, 325, 327, 329. The ECU 32 may be vented to atmosphere via an external vent 314.

The first arrangement 320 of the IASU 20 also includes a compressor 360 including an electric motor 362, a low-pressure air pump 364, and a high-pressure air pump 366. The compressor 360 is configured to supply pressurized air in a first pressurized air passage 370. One or both of the air pumps 364, 366 may include a piston that is driven by the electric motor 362 and configured to supply the pressurized air in the first pressurized air passage 370. The compressor 360 may include the dual piston assembly 40 of the present disclosure. In some embodiments, and as shown in FIG. 9, an intermediate air passage 368 connects the low-pressure air pump 364, and the high-pressure air pump 366. The low-pressure air pump 364 sucks air from an air intake 316 and discharges the air at a higher pressure into the intermediate air passage 368. The low-pressure air pump 364 includes a low-pressure inlet check valve LICV and a low-pressure outlet check valve LOCV. The high-pressure air pump 366 sucks air from the intermediate air passage 368 and discharges the air at a higher pressure into the first pressurized air passage 370. The high-pressure air pump 366 includes a high-pressure inlet check valve HICV and a high-pressure outlet check valve 100.

The first arrangement 320 of the IASU 20 also includes a dryer 372 configured to remove moisture from the pressurized air in the first pressurized air passage 370 and to supply dried pressurized air in a second pressurized air passage 374. In some embodiments, the dryer 372 may include the arrangement shown in FIGS. 8A-8C, and described elsewhere in the present disclosure. For example, the dryer 372 may include a desiccant housing 28 defining a desiccant cavity 110 holding a desiccant material, with the desiccant material disposed in an airflow path between the first pressurized air passage 370 and the second pressurized air passage 374 for removing moisture from air passing therebetween.

A supply control valve 376 is configured to configured to selectively control airflow between the second pressurized air passage 374 and the manifold 338. The supply control valve 376 may be a normally-closed solenoid valve. In some embodiments, and as shown in FIG. 9, a flow-control orifice 378 is disposed in the second pressurized air passage 374 to restrict the flow of air therethrough.

In some embodiments, and as shown in FIG. 9, a boost valve 380 provides selective fluid communication between the reservoir port 312 and an inlet of the compressor 360. The inlet of the compressor 360 may be the intermediate air passage 368. Alternatively, the inlet of the compressor 360 may be fluidly connected to the intake of the low-pressure air pump 364. However, such a configuration may require an additional check valve (not shown in the Figs.) to prevent boost air from the boost valve 380 from leaking out of the air intake 316. A boost check valve 382 is disposed in a boost passage 384 between the boost valve 380 and the intermediate air passage 368 and is configured to allow airflow from the reservoir 310 to the inlet of the compressor 360 while blocking airflow in an opposite direction. The boost passage 384 may include the through-bore 150 described elsewhere in the present disclosure.

A third pressurized air passage 388 is fluidly connected to the second pressurized air passage 374, between the flow-control orifice 378 and the supply control valve 376 and via an exhaust check valve 390. The exhaust check valve 390 allows airflow from the second pressurized air passage 374 into the third pressurized air passage 388 while blocking airflow in an opposite direction. The third pressurized air passage 388 may include an accumulator 392, which may be a hollow volume in the compressor housing 24.

The first arrangement 320 of the IASU 20 also includes a piloted exhaust valve 52 which includes an inlet passage 131 and a discharge passage 132 and is configured to control airflow therebetween. The piloted exhaust valve 52 may include the design shown in FIG. 8A and described elsewhere in the present disclosure. The piloted exhaust valve 52 includes an inlet passage 131 and a discharge passage 132 and is configured to control airflow therebetween. The piloted exhaust valve 52 may include a stepped piston 134 disposed within an exhaust valve bore 54 having a semi-closed end 53 and a tubular portion 139 extending from the semi-closed end 53 and into the exhaust valve bore 54. The stepped piston 134 divides the exhaust valve bore 54 between a first chamber 146 and a second chamber 147. The stepped piston 134 includes a control surface 136 defining an end of the first chamber 146. The stepped piston 134 also includes a lower surface 137 opposite the control surface 136. The stepped piston 134 also includes a piston extension 138 that extends from the control surface 136 and into the tubular portion 139. The piston extension 138 includes a sealing face 140 that is configured to selectively seal against a valve seat 141, blocking fluid communication between the inlet passage 131 and the discharge passage 132. The piloted exhaust valve 52 also includes a valve spring 143 disposed within the second chamber and configured to bias the sealing face 140 of the stepped piston 134 toward the valve seat 141.

The stepped piston 134 is configured to move away from the semi-closed end 53 in response to air pressure in the first chamber 146 acting on the control surface 136 overcoming a sum of a first force of air pressure in the second chamber 147 acting on the lower surface 137 and a biasing force of the valve spring 143, thereby causing the sealing face 140 to be pulled away from the valve seat 141, and providing fluid communication between the inlet passage 131 and the discharge passage 132.

In some embodiments, and as shown in FIG. 9, the inlet passage 131 of the piloted exhaust valve 52 may be in direct fluid communication with the first pressurized air passage 370, with no obstructions or valves therebetween. In some embodiments, and as shown in FIG. 9, the discharge passage 132 of the piloted exhaust valve 52 may be in direct fluid communication with the ambient atmosphere via the exhaust passage 37 and the exhaust muffler 38, and with no valves therebetween. In some embodiments, and as shown in FIG. 9, a flow restrictor, such as an orifice 397 is disposed in the exhaust passage 37 between the discharge passage 132 of the piloted exhaust valve 52 and the exhaust muffler 38 for limiting a flow rate therethrough.

The first arrangement 320 of the IASU 20 also includes a first exhaust control valve 394 configured to selectively control flow of pressurized air from the second pressurized air passage 374 to the first chamber 146 of the piloted exhaust valve 52. The first exhaust control valve 394 may be a normally-closed solenoid valve. In some embodiments, and as shown in FIG. 9, the first exhaust control valve 394 may selectively control airflow between the third pressurized air passage 388 and a first control air passage 393 that is in fluid communication with the first chamber 146 of the piloted exhaust valve 52.

The first arrangement 320 of the IASU 20 also includes a second exhaust control valve 396 configured to selectively control flow of pressurized air between the first chamber 146 and the second chamber 147 of the piloted exhaust valve 52. The second exhaust control valve 396 may be a normally-open solenoid valve. In some embodiments, and as shown in FIG. 9, the second exhaust control valve 394 may selectively control airflow between the first control air passage 393 and a second control air passage 395 that is in fluid communication with the second chamber 147 of the piloted exhaust valve 52.

In operation, the exhaust control valves 394, 396 may control operation of the piloted control valve 52, thereby controlling a flow of air that is exhausted from the first pressurized air passage 370.

FIG. 10 shows a schematic diagram of a second arrangement 420 of the IASU 20. The second arrangement 420 for the IASU 20 may be similar or identical to the first arrangement 320 of the IASU 20, shown in FIG. 9, with a few changes described herein.

The second arrangement 420 of the IASU 20 includes a first check valve 430 disposed in the second pressurized air passage 374 between the dryer 372 and the supply control valve 376 and configured to allow airflow from the manifold 338 to the dryer 372, while blocking airflow in an opposite direction. A bypass passage 432 provides fluid communication between the manifold 338 and the second pressurized air passage 374, around the supply control valve 376 and the first check valve 430. A second check valve 434 is disposed in the bypass passage 432 and is configured to allow airflow from the second pressurized air passage 374 to the manifold 338 while blocking airflow in an opposite direction.

In the second arrangement 420 of the IASU 20, and as shown in FIG. 10, the third pressurized air passage 388 is fluidly connected to the second pressurized air passage 374, between the first check valve 430 and the supply control valve 376. The third pressurized air passage 388 is also directly fluidly connected to the first chamber 146 of the piloted exhaust valve 52, with no control valves therebetween.

In the second arrangement 420 of the IASU 20, and as shown in FIG. 10, the inlet passage 131 of the piloted exhaust valve 52 is in fluid communication with the first pressurized air passage 370. The discharge passage 132 of the of the piloted exhaust valve 52 is fluidly connected to the exhaust passage 37, as in the first arrangement 320 of the IASU 20. However, and unlike the first arrangement 320 of the IASU 20, the second chamber 147 of the piloted exhaust valve 52 is also fluidly coupled to the exhaust passage 37.

The second arrangement 420 of the IASU 20 includes only one exhaust control valve 396. The exhaust control valve 396 is configured to selectively control flow of pressurized air between the first chamber 146 and the second chamber 147 of the piloted exhaust valve 52. As shown in FIG. 10, the exhaust control valve 396 is fluidly to the first chamber 146 of the piloted exhaust valve 52 via the third pressurized air passage 388. The exhaust control valve 396 is also fluidly to the second chamber 147 of the piloted exhaust valve 52 via the exhaust passage 37. The exhaust control valve 396 must be a normally-open solenoid valve.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An integrated air supply unit comprising:
    a compressor housing including a piston slidably disposed within a piston bore;
    a pressure control unit (PCU) body defining a plurality of fluid passages and a plurality of solenoid valves configured to selectively control airflow through corresponding ones of the plurality of fluid passages; and
    a desiccant housing extending between the compressor housing and the PCU body and defining a desiccant cavity configured to hold a desiccant container for removing moisture from air passing therethrough,
    wherein the desiccant housing further defines a guide hole configured to guide a large bolt connecting the compressor housing and the PCU body and across the desiccant housing.

2. The integrated air supply unit of claim 1, wherein the desiccant housing defines a through-bore extending between the compressor housing and the PCU body sealed by radial seals on each end thereof.

3. The integrated air supply unit of claim 1, further comprising:
    the compressor housing defining a fluid passage between the piston bore and the desiccant cavity; and
    a check valve including an elastomeric member biased against the compressor housing to selectively block the fluid passage between the piston bore and the desiccant cavity and allowing airflow from the piston bore into the desiccant cavity while blocking airflow in an opposite direction.

4. The integrated air supply unit of claim 1, wherein the piston bore is a stepped bore defined by the compressor housing, wherein the stepped bore includes a low-pressure bore having a first cross-sectional area and a high-pressure bore coaxial with the low-pressure bore and having a second cross-sectional area smaller than the first cross-sectional area;
    wherein the integrated air supply unit comprises: a sliding member including a low-pressure piston slidably disposed in the low-pressure bore, a high-pressure piston slidably disposed in the high-pressure bore and a central portion extending between the low-pressure piston and the high-pressure piston, wherein said piston includes the low-pressure piston and the high-pressure piston, the central portion defining a hollow cavity in the sliding member between the low-pressure piston and the high-pressure piston; and
    an articulating member disposed within the hollow cavity of the sliding member and pivotably coupled thereto by a wrist pin.

5. The integrated air supply unit of claim 4, further comprising:
    a motor assembly including a motor case and a motor shaft rotatable about an axis and coupled to an eccentric shaft offset from the axis; and
    a bearing located within the hollow cavity of the sliding member and disposed between the articulating member and about the eccentric shaft and causing the articulating member transmit a oscillating linear motion through the stepped bore in response to the motor shaft rotating about the axis.

6. The integrated air supply unit of claim 4, further comprising: a motor assembly including a motor case and a motor shaft rotatable about an axis and coupled to an eccentric shaft offset from the axis;
    wherein the compressor housing defines a motor bore extending transverse to the stepped bore and configured to receive the motor shaft; and
    wherein the compressor housing defines a boss extending outwardly around at least a portion of a periphery of the motor bore for engaging the motor case.

7. The integrated air supply unit of claim 4, further comprising:
    a passage extending through the low-pressure piston; and
    a reed valve covering the passage and permitting airflow therethrough in one direction while blocking airflow in an opposite direction.

8. The integrated air supply unit of claim 7, wherein the reed valve is fixed to a face of the low-pressure piston by one of a fastener, an adhesive, or by welding.

9. An integrated air supply unit comprising:
    a manifold including at least one fluid passage;
    a discharge control valve configured to selectively control airflow from the manifold to a supply port for supplying pressurized air to an external device;
    a compressor configured to supply pressurized air in a first pressurized air passage;
    a dryer configured to remove moisture from the pressurized air in the first pressurized air passage and to supply dried pressurized air in a second pressurized air passage;
    a supply control valve configured to configured to selectively control airflow between the second pressurized air passage and the manifold;
    a piloted exhaust valve including an inlet passage and a discharge passage and configured to control airflow therebetween, the piloted exhaust valve including an exhaust valve bore having a semi-closed end, a tubular portion extending from the semi-closed end and into the exhaust valve bore, and a stepped piston slidably movable within the exhaust valve bore and dividing the exhaust valve bore between a first chamber and a second chamber, the stepped piston including a control surface defining an end of the first chamber, and a lower surface opposite the control surface, the stepped piston including a piston extension extending into the tubular portion, the piston extension including a sealing face configured to selectively seal against a valve seat to block fluid communication between the inlet passage and the discharge passage;

a first exhaust control valve configured to selectively control flow of pressurized air from the second pressurized air passage to the first chamber of the piloted exhaust valve; and a second exhaust control valve configured to selectively control flow of pressurized air between the first chamber and the second chamber of the piloted exhaust valve; and wherein the inlet passage of the piloted exhaust valve is in direct fluid communication with the first pressurized air passage.

10. The integrated air supply unit of claim 9, wherein the dryer further comprises a desiccant housing defining a desiccant cavity holding a desiccant material; and wherein the desiccant material is disposed in an airflow path between the first pressurized air passage and the second pressurized air passage for removing moisture from air passing therebetween.

11. The integrated air supply unit of claim 9, wherein the compressor further comprises:
an electric motor; and
at least one piston driven by the electric motor and configured to supply pressurized air in the first pressurized air passage.

12. The integrated air supply unit of claim 9, further comprising:
a reservoir port providing a fluid connection to an external reservoir; and
at least one reservoir valve configured to selectively provide fluid communication between the reservoir port and the manifold.

13. The integrated air supply unit of claim 12, wherein the at least one reservoir valve includes two reservoir valves in a parallel configuration and having different flow characteristics.

14. The integrated air supply unit of claim 12, further comprising:
a boost valve configured to selectively provide fluid communication between the reservoir port and an inlet of the compressor.

15. An integrated air supply unit comprising:
a manifold including at least one fluid passage;
a discharge control valve configured to selectively control airflow from the manifold to a supply port for supplying pressurized air to an external device;
a compressor configured to supply pressurized air in a first pressurized air passage;
a dryer configured to remove moisture from the pressurized air in the first pressurized air passage and to supply dried pressurized air in a second pressurized air passage;

a supply control valve configured to configured to selectively control airflow between the second pressurized air passage and the manifold;

a piloted exhaust valve including an inlet passage and a discharge passage and configured to control airflow therebetween, the piloted exhaust valve including an exhaust valve bore having a semi-closed end, a tubular portion extending from the semi-closed end and into the exhaust valve bore, and a stepped piston slidably movable within the exhaust valve bore and dividing the exhaust valve bore between a first chamber and a second chamber, the stepped piston including a control surface defining an end of the first chamber, and a lower surface opposite the control surface, the stepped piston including a piston extension extending into the tubular portion, the piston extension including a sealing face configured to selectively seal against a valve seat to block fluid communication between the inlet passage and the discharge passage;

an exhaust control valve configured to selectively control flow of air between the first chamber and the second chamber of the piloted exhaust valve;

wherein the first chamber of the piloted exhaust valve is in direct fluid communication with the second pressurized air passage;

wherein the second chamber of the piloted exhaust valve is direct in fluid communication with an exhaust passage open to atmosphere; and wherein the inlet passage of the piloted exhaust valve is in direct fluid communication with the first pressurized air passage.

16. The integrated air supply unit of claim 15, wherein the dryer further comprises a desiccant housing defining a desiccant cavity holding a desiccant material; and wherein the desiccant material is disposed in an airflow path between the first pressurized air passage and the second pressurized air passage for removing moisture from air passing therebetween.

17. The integrated air supply unit of claim 15, further comprising:
a first check valve disposed in the second pressurized air passage and configured to allow airflow from the manifold to the dryer while blocking airflow in an opposite direction; and
a bypass passage providing fluid communication between the manifold and the second pressurized air passage, with a second check valve disposed in the bypass passage and configured to allow airflow from the second pressurized air passage to the manifold while blocking airflow in an opposite direction.

18. The integrated air supply unit of claim 15, further comprising:
a reservoir port providing a fluid connection to an external reservoir; and
at least one reservoir valve configured to selectively provide fluid communication between the reservoir port and the manifold.

19. The integrated air supply unit of claim 18, further comprising:
a boost valve configured to selectively provide fluid communication between the reservoir port and an inlet of the compressor.

* * * * *